(12) United States Patent
Amano et al.

(10) Patent No.: US 9,948,993 B2
(45) Date of Patent: Apr. 17, 2018

(54) INFORMATION PROCESSING APPARATUS AND INFORMATION PROCESSING METHOD

(71) Applicant: SONY CORPORATION, Tokyo (JP)

(72) Inventors: Sho Amano, Tokyo (JP); Hideki Iwami, Saitama (JP); Tomoya Yamaura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/127,899

(22) PCT Filed: Mar. 25, 2015

(86) PCT No.: PCT/JP2015/059150
§ 371 (c)(1),
(2) Date: Sep. 21, 2016

(87) PCT Pub. No.: WO2015/151962
PCT Pub. Date: Oct. 8, 2015

(65) Prior Publication Data
US 2017/0118530 A1    Apr. 27, 2017

(30) Foreign Application Priority Data

Mar. 31, 2014 (JP) ................................. 2014-072176

(51) Int. Cl.
*H04N 21/41* (2011.01)
*H04N 21/61* (2011.01)
(Continued)

(52) U.S. Cl.
CPC ... *H04N 21/6175* (2013.01); *H04N 21/23805* (2013.01); *H04N 21/2402* (2013.01)

(58) Field of Classification Search
CPC ........... H04N 21/4104; H04N 21/4126; H04N 21/41407; H04N 21/6131; H04N 21/643; H04N 21/647; H04L 69/24
(Continued)

(56) References Cited

U.S. PATENT DOCUMENTS

| | | |
|---|---|---|
| 2010/0272054 A1 | 10/2010 | Tatsuta et al. |
| 2014/0365611 A1* | 12/2014 | Praveenkumar ........ H04L 69/24 709/219 |
| 2015/0085847 A1 | 3/2015 | Yamaura |

FOREIGN PATENT DOCUMENTS

| | | |
|---|---|---|
| JP | 2006-148589 A | 6/2006 |
| JP | 2009-509381 A | 3/2009 |

(Continued)

*Primary Examiner* — Dominic C Saltarelli
(74) *Attorney, Agent, or Firm* — Oblon, McClelland, Maier & Neustadt, L.L.P.

(57) ABSTRACT

Transmission and reception of a stream are appropriately performed between a plurality of information processing apparatuses. An information processing apparatus includes an acquisition unit and a control unit. The acquisition unit acquires information for use in determination for controlling transmission and reception of a stream performed between a plurality of information processing apparatuses in accordance with the Wireless Fidelity (Wi-Fi) CERTIFIED Miracast specification. Also, the control unit controls the transmission and reception of a stream on the basis of the acquired information (information for use in determination for controlling transmission and reception of a stream).

17 Claims, 18 Drawing Sheets

(51) Int. Cl.
*H04N 21/64* (2011.01)
*H04N 21/238* (2011.01)
*H04N 21/24* (2011.01)

(58) Field of Classification Search
USPC .................................. 725/85, 151; 709/219
See application file for complete search history.

(56) References Cited

FOREIGN PATENT DOCUMENTS

| WO | 2009/084198 A | 7/2009 |
| WO | 2009/084198 A1 | 7/2009 |
| WO | 2013/153888 A | 10/2013 |
| WO | 2013/153888 A1 | 10/2013 |

\* cited by examiner

FIG. 5

CONSTRAINT INFORMATION MANAGEMENT TABLE 460

| MAC ADDRESS | NAME OF DEVICE | SUPPORTED FUNCTION | SUPPORTED FREQUENCY BAND/CHANNEL | CONSTRAINTS ON CONCURRENT USE OF CHANNELS | MAXIMUM PHY RATE | UPPER LIMIT OF BIT RATE FOR ALL DEVICES | TYPE OF VIDEO ENCODER AND NUMBER OF VIDEO ENCODERS OPERATING CONCURRENTLY | TYPE OF AUDIO ENCODER AND NUMBER OF AUDIO ENCODERS OPERATING CONCURRENTLY | TYPE OF VIDEO DECODER AND NUMBER OF VIDEO DECODERS OPERATING CONCURRENTLY | TYPE OF AUDIO DECODER AND NUMBER OF AUDIO DECODERS OPERATING CONCURRENTLY | MAXIMUM RESOLUTION OF IMAGE TRANSMITTED DURING OPERATION AS SOURCE APPARATUS | RESOLUTION OF DISPLAY DEVICE DURING OPERATION AS SINK APPARATUS |
|---|---|---|---|---|---|---|---|---|---|---|---|---|
| XX:XX:XX: XX:XX:XX | Phone -01 | TRANSMISSION | 2.4-GHz BAND: 1ch(2412MHz)~ 1ch(2462MHz) 5-GHz BAND: 36ch(5180MHz), 40ch(5200MHz), 44ch(5220MHz), 48ch(5240MHz) | UP TO 2 CHANNELS CONCURRENTLY FOR ALL APPARATUSES, BUT 2.4-GHz BAND AND 5-GHz BAND CANNOT BE USED CONCURRENTLY, AND 2 CHANNELS CANNOT BE USED CONCURRENTLY IN 5-GHz BAND | 72 Mbps | 20 Mbps | H.264: UP TO 2 | LPCM: NO LIMIT AAC: UP TO 4 | (NOT SUPPORTED) | (NOT SUPPORTED) | 1280 × 720 | (NOT SUPPORTED) |
| YY:YY:YY: YY:YY:YY | Bedroom TV | RECEPTION | 2.4-GHz BAND: 1ch(2412MHz)~ 1ch(2462MHz) 5-GHz BAND: 36ch(5180MHz), 40ch(5200MHz), 44ch(5220MHz), 48ch(5240MHz), 52ch(5260MHz), 56ch(5280MHz), 60ch(5300MHz), 64ch(5320MHz) | UP TO 3 CHANNELS CONCURRENTLY FOR ALL APPARATUSES, BUT UP TO 2 CHANNELS CAN BE USED CONCURRENTLY IN 2.4-GHz BAND, AND UP TO 2 CHANNELS CAN BE USED CONCURRENTLY IN 5-GHz BAND | 2.4-GHz BAND 300 Mbps 5-GHz BAND 1300 Mbps | 100 Mbps | (NOT SUPPORTED) | (NOT SUPPORTED) | H.265: 1 H.264: UP TO 4 | LPCM: NO LIMIT AAC: UP TO 8 AC-3: UP TO 8 | (NOT SUPPORTED) | 3840 × 2160 |
| ZZ:ZZ:ZZ: ZZ:ZZ:ZZ | MyTablet | TRANSMISSION/ RECEPTION | 2.4-GHz BAND: 1ch(2412MHz)~ 1ch(2462MHz) 5-GHz BAND: 36ch(5180MHz), 40ch(5200MHz), 44ch(5220MHz), 48ch(5240MHz) | UP TO 2 CHANNELS CONCURRENTLY FOR ALL APPARATUSES, BUT 2 CHANNELS CANNOT BE USED CONCURRENTLY IN 5-GHz BAND | 150 Mbps | 40 Mbps | H.265: 1 H.264: 1 | LPCM: NO LIMIT TOTAL OF UP TO 2 FOR AAC AND AC-3 | H.265: 1 H.264: 1 | LPCM: NO LIMIT TOTAL OF UP TO 2 FOR AAC AND AC-3 | 1920 × 1080 | 1920 × 1080 |
| ... | ... | ... | ... | ... | ... | ... | ... | ... | ... | ... | ... | ... |

FIG. 6

OPERATION INFORMATION MANAGEMENT TABLE 470

| MAC ADDRESS OF SOURCE APPARATUS | MAC ADDRESS OF SINK APPARATUS | FREQUENCY BAND | WIRELESS CHANNEL | VIDEO CODEC | VIDEO RESOLUTION | FRAME RATE | IMAGE BIT RATE | AUDIO FORMAT | SAMPLING FREQUENCY | NUMBER OF QUANTIZATION BITS | NUMBER OF AUDIO CHANNELS | AUDIO BIT RATE | STATUS |
|---|---|---|---|---|---|---|---|---|---|---|---|---|---|
| XX:XX:XX: XX:XX:XX | YY:YY:YY: YY:YY:YY | 2.4GHz | 6ch (2437MHz) | H.264 | 1280 × 720 | 29.97 fps | 6 Mbps | AAC | 48000 Hz | 16bit | 2ch | 128kbps | BEING TRANSMITTED |
| ZZ:ZZ:ZZ: ZZ:ZZ:ZZ | YY:YY:YY: YY:YY:YY | 5GHz | 48ch (5240MHz) | H.265 | 1920 × 1080 | 29.97 fps | 15 Mbps | AAC | 48000 Hz | 16bit | 6ch | 384kbps | BEING TRANSMITTED |
| ... | ... | ... | ... | ... | ... | ... | ... | ... | ... | ... | ... | ... | ... |

FIG. 7

ENVIRONMENT INFORMATION
MANAGEMENT TABLE 480

| FREQUENCY BAND | CHANNEL | CONGESTION LEVEL | | | | |
|---|---|---|---|---|---|---|
| | | FOR PAST 5 SEC | 10 SEC BEFORE TO 5 SEC BEFORE | 15 SEC BEFORE TO 10 SEC BEFORE | 20 SEC BEFORE TO 15 SEC BEFORE | ... |
| 2.4GHz | 1ch | 30% | 42% | 35% | 30% | ... |
| 2.4GHz | 2ch | 24% | 30% | 25% | 25% | ... |
| ... | ... | ... | ... | ... | ... | ... |
| 2.4GHz | 14ch | 15% | 12% | 12% | 13% | ... |
| 5GHz | 36ch | 5% | 6% | 5% | 5% | ... |
| 5GHz | 40ch | 12% | 11% | 13% | 16% | ... |
| ... | ... | ... | ... | ... | ... | ... |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2015/059150 filed on Mar. 25, 2015, which claims priority benefit of Japanese Patent Application No. 2014-072176 filed in the Japan Patent Office on Mar. 31, 2014. Each of the above-referenced applications is hereby incorporated herein by reference in its entirety.

TECHNICAL FIELD

The present technology relates to information processing apparatuses. More particularly, the present technology relates to information processing apparatuses and information processing methods for exchanging various items of information.

BACKGROUND ART

There have conventionally been wireless communication techniques for exchanging various items of information by utilizing wireless communication. For example, a wireless communication technique for exchanging various items of information between two information processing apparatuses by utilizing wireless communication has been proposed.

Also, for example, a wireless LAN base station management apparatus has been proposed which sets a channel communication mode on the basis of communication control reservation and information about communication conditions of a base station, and causes the base station to perform communication in the set communication mode (see, for example, Patent Literature 1).

CITATION LIST

Patent Literature

Patent Literature 1: JP 2006-148589A

SUMMARY OF INVENTION

Technical Problem

In the above conventional technique, the channel communication mode of a terminal can be set on the basis of the reservation.

Here, it is assumed that a stream is transmitted and received between a plurality of information processing apparatuses in accordance with the Wireless Fidelity (Wi-Fi) CERTIFIED Miracast specification (the title of the technical specification: Wi-Fi Display). For example, it is assumed that one source apparatus transmits a stream to a plurality of sink apparatuses or that a plurality of source apparatuses transmit a stream to one sink apparatus. In this case, it is important to provide appropriate settings for each apparatus so that the entire system can appropriately perform transmission and reception of a stream.

With the above circumstances in mind, the present technology has been made. It is an object of the present technology to appropriately perform transmission and reception of a stream between a plurality of information processing apparatuses.

Solution to Problem

The present technology has been made to solve the above problems, and according to a first aspect thereof, there is provided an information processing apparatus, an information processing method, and a program for causing a computer to execute the method, the information processing method including: an acquisition unit configured to acquire information for use in determination for controlling transmission and reception of a stream performed between a plurality of information processing apparatuses in accordance with the Wireless Fidelity (Wi-Fi) CERTIFIED Miracast specification (technical specification name: Wi-Fi Display); and a control unit configured to control the transmission and reception on the basis of the acquired information. As a result, provided is the action of acquiring information for use in determination for controlling transmission and reception of a stream performed between a plurality of information processing apparatuses in accordance with the Wi-Fi CERTIFIED Miracast specification, and controlling the transmission and reception on the basis of the information.

According to the first aspect, the acquisition unit may acquires, as the information for use in the determination, at least one of one or more items of information about performance of a first information processing apparatus included in the plurality of information processing apparatuses, the one or more items of information including constraint information about constraint conditions for the transmission and reception, information about statuses of the transmission and reception of a stream, and information about a wireless environment in which the transmission and reception of a stream are performed. As a result, provided is the action of acquiring at least one of constraint information, information about the status of transmission and reception of a stream, and information about a wireless environment.

According to the first aspect, the control unit may generate control information for controlling the transmission and reception, on the basis of the acquired information, and transmit the generated control information to at least one of the plurality of information processing apparatuses. As a result, provided is the action of generating control information for controlling transmission and reception of a stream on the basis of acquired information, and transmitting the generated control information to at least one of a plurality of information processing apparatuses.

According to the first aspect, the control unit may generate control information for setting at least one of a frequency band and channel for the stream, a bit rate to be assigned to the stream, an image compression scheme for the stream, and an audio compression scheme for the stream, in the first information processing apparatus included in the plurality of information processing apparatuses, and control the transmission and reception involved with the first information processing apparatus, on the basis of the generated control information. As a result, provided is the action of generating control information for setting at least one of a frequency band and channel for a stream, a bit rate to be assigned to a stream, an image compression scheme for a stream, and an audio compression scheme for a stream, in a first information processing apparatus, and controlling transmission and reception involved with the first information processing apparatus, on the basis of the generated control information.

According to the first aspect, the control unit may newly generate the control information, which is triggered by acquisition of the information for use in the determination, and transmit the newly generated control information to at least one of the plurality of information processing apparatuses. As a result, provided is the action of newly generating control information, which is triggered by acquisition of information for use in determination, and transmitting the newly generated control information to at least one of a plurality of information processing apparatuses.

According to the first aspect, the control unit may transmit the control information including time information for specifying time when the first information processing apparatus included in the plurality of information processing apparatuses is to control the transmission and reception, to the first information processing apparatus, and the first information processing apparatus may control the transmission and reception on the basis of the received control information at the time specified by the time information included in the received control information. As a result, provided is the action of controlling transmission and reception of a stream on the basis of received control information at time specified by time information included in the received control information.

According to the first aspect, when a channel used for the stream is to be changed, a channel switch request frame and a channel switch response frame specified in the IEEE 802.11z specification may be used to exchange information about changing of the channel on the basis of the control information between the plurality of information processing apparatuses. As a result, provided is the action of, when a channel used for a stream is to be changed, using a channel switch request frame and a channel switch response frame to exchange information about changing of the channel on the basis of control information between a plurality of information processing apparatuses.

According to the first aspect, the acquisition unit may receive and acquire the information for use in the determination transmitted from the first information processing apparatus included in the plurality of information processing apparatuses, and the control unit may generate the control information about a second information processing apparatus included in the plurality of information processing apparatuses, on the basis of the information for use in the determination transmitted from the first information processing apparatus, and transmit the generated control information to the second information processing apparatus. As a result, provided is the action of generating control information about a second information processing apparatus on the basis of information transmitted from a first information processing apparatus, and transmitting the generated control information to the second information processing apparatus.

According to the first aspect, the first information processing apparatus included in the plurality of information processing apparatuses may include a wireless communication unit configured to transmit constraint information about constraint conditions for the transmission and reception, the constraint information being information about performance of the first information processing apparatus, as the information for use in the determination, to the information processing apparatus, and receives control information for controlling the transmission and reception from the information processing apparatus, and a control unit configured to control the transmission and reception on the basis of the received control information. As a result, provided is the action of causing a first information processing apparatus to transmit constraint information to the information processing apparatus, and receive control information from the information processing apparatus, and control transmission and reception of a stream on the basis of the received control information.

According to the first aspect, the first information processing apparatus included in the plurality of information processing apparatuses may include a first wireless communication unit configured to operate as a group owner when directly connecting to a second information processing apparatus included in the plurality of information processing apparatuses in one-to-one correspondence using wireless communication, and transmitting and receiving data to and from the second information processing apparatus, and a second wireless communication unit configured to connect, as a client, to the first wireless communication unit, and connect to the second information processing apparatus and transmit and receive a stream to and from the second information processing apparatus in accordance with the Wi-Fi CERTIFIED Miracast specification. As a result, provided is the action of causing a first wireless communication unit to operate as a group owner, and causing a second wireless communication unit to connect, as a client, to the first wireless communication unit, and connect to a second information processing apparatus and transmit and receive a stream to and from the second information processing apparatus in accordance with the Wi-Fi CERTIFIED Miracast specification.

According to the first aspect, the first wireless communication unit and the second wireless communication unit may exchange information with each other by communication through Wi-Fi Direct connection, or communication compliant with a specification other than IEEE 802.11 and corresponding to the communication through Wi-Fi Direct connection. As a result, provided is the action of causing a first wireless communication unit and a second wireless communication unit to exchange information with each other by communication through Wi-Fi Direct connection, or communication compliant with a specification other than IEEE 802.11 and corresponding to the communication through Wi-Fi Direct connection.

According to the first aspect, the second wireless communication unit may generate a direct link with respect to the second information communication apparatus using a communication scheme specified in the IEEE 802.11z specification, and transmit and receives the stream. As a result, provided is the action of causing a second wireless communication unit to generate a direct link with respect to a second information communication apparatus using a communication scheme specified in the IEEE 802.11z specification, and transmit and receive a stream.

According to a second aspect of the present technology, there is provided an information processing apparatus, an information processing method, and a program for causing a computer to execute the method, the information processing apparatus including: a wireless communication unit configured to transmit, to a control apparatus for controlling transmission and reception of a stream to and from another information processing apparatus in accordance with the Wi-Fi CERTIFIED Miracast specification, constraint information about constraint conditions for the transmission and reception, the constraint information being information about performance of the information processing apparatus, and receive control information for controlling the transmission and reception from the control apparatus; and a control unit configured to control the transmission and reception on the basis of the received control information. As a result, provided is the action of transmitting constraint information to a control apparatus, receiving control information from the control apparatus, and controlling transmission and reception of a stream on the basis of the received control information.

According to a third aspect of the present technology, there is provided an information processing apparatus, an information processing method, and a program for causing a computer to execute the method, the information processing apparatus including: a first wireless communication unit configured to operate as a group owner when directly connecting to another information processing apparatus in one-to-one correspondence using wireless communication, and transmitting and receiving data to and from the other information processing apparatus, and a second wireless communication unit configured to connect, as a client, to the first wireless communication unit, and connect to the other information processing apparatus and transmit and receive a stream to and from the other information processing apparatus in accordance with the Wi-Fi CERTIFIED Miracast specification. As a result, provided is the action of causing a first wireless communication unit to operate as a group owner, and causing a second wireless communication unit to connect, as a client, to the first wireless communication unit, and connect to a second information processing apparatus and transmit and receive a stream to and from the second information processing apparatus in accordance with the Wi-Fi CERTIFIED Miracast specification.

According to the third aspect, the first wireless communication unit and the second wireless communication unit may exchange information with each other by communication through Wi-Fi Direct connection, or communication compliant with a specification other than IEEE 802.11 and corresponding to the communication through Wi-Fi Direct connection. As a result, provided is the action of causing a first wireless communication unit and a second wireless communication unit to exchange information with each other by communication through Wi-Fi Direct connection, or communication compliant with a specification other than IEEE 802.11 and corresponding to the communication through Wi-Fi Direct connection.

According to the third aspect, the second wireless communication unit may generate a direct link with respect to the other information communication apparatus using a communication scheme specified in the IEEE 802.11z specification, and transmit and receives the stream. As a result, provided is the action of causing a second wireless communication unit to generate a direct link with respect to a second information communication apparatus using a communication scheme specified in the IEEE 802.11z specification, and transmit and receive a stream.

Advantageous Effects of Invention

According to the present technology, the advantageous effect of appropriately performing transmission and reception of a stream between a plurality of information processing apparatuses can be achieved. Note that the effects described here are not exhaustive, and any effects described in the present disclosure may be achieved.

BRIEF DESCRIPTION OF DRAWINGS

FIG. 5 is a diagram schematically showing an example of management contents of a constraint information management table 460 stored in a storage unit 450 in an embodiment of the present technology.

FIG. 6 is a diagram schematically showing an example of management contents of an operation information management table 470 stored in a storage unit 450 in an embodiment of the present technology.

FIG. 7 is a diagram schematically showing an example of management contents of an environment information management table 480 stored in a storage unit 450 in an embodiment of the present technology.

DESCRIPTION OF EMBODIMENT(S)

Modes for carrying out the present technology (hereinafter referred to as embodiments) will now be described. Description will be provided in the following order.

1. Embodiments (Communication Control: Examples of Control of Transmission and Reception of a Stream Between a Plurality of Information Processing Apparatuses in Accordance with the Wi-Fi CERTIFIED Miracast Specification)
2. Application Examples <1. First Embodiment>

[Configuration Examples of Communication System]

Figure 1:
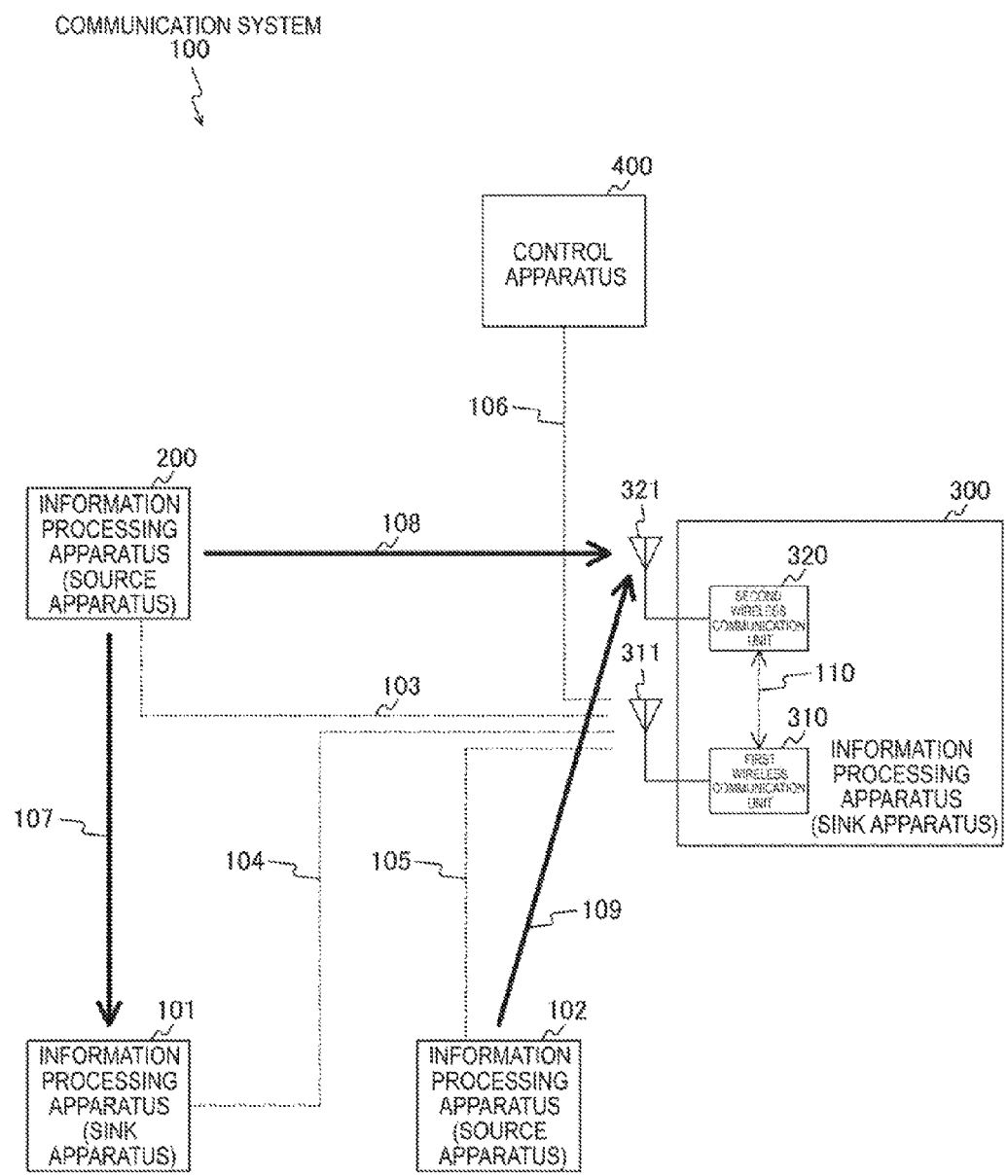
FIG. 1 is a block diagram showing a system configuration example of a communication system 100 in an embodiment of the present technology.

FIG. 1 is a block diagram showing a system configuration example of a communication system 100 in an embodiment of the present technology.

The communication system 100 includes an information processing apparatus 101, an information processing apparatus 102, an information processing apparatus 200, an information processing apparatus 300, and a control apparatus 400. Note that the control apparatus 400 is an example of an information processing apparatus as set forth in the appended claims.

The information processing apparatuses 101, 102, 200, and 300, and the control apparatus 400 are an electronic apparatus having a wireless communication function. For example, the information processing apparatus 101, 102, 200, and 300, and the control apparatus 400 are an information processing apparatus (e.g., a personal computer) or hand-held information processing apparatus (e.g., a smartphone, a tablet terminal) having a wireless communication function. Note that when the information processing apparatus 300 and the control apparatus 400 are connected by a wire, the wireless communication function of the control apparatus 400 can be removed.

For example, the information processing apparatuses 101, 102, 200, and 300, and the control apparatus 400 are a wireless communication apparatus compliant with Institute of Electrical and Electronics Engineers (IEEE) 802.11, IEEE 802.15, IEEE 802.16, or a 3rd Generation Partnership Project (3GPP) specification (e.g., Wideband Code Division Multiple Access (W-CDMA), Global System for Mobile Communications (GSM (registered trademark)), Worldwide Interoperability for Microwave Access (WiMAX), WiMAX2, Long Term Evolution (LTE), LTE-A (Advanced)). The information processing apparatuses 101, 102, 200, and 300, and the control apparatus 400 can exchange various items of information by utilizing the wireless communication function. For example, wireless communication can be performed between each apparatus using a wireless local area network (LAN).

As this wireless LAN, for example, Wireless Fidelity (Wi-Fi) Direct, Tunneled Direct Link Setup (TDLS), an ad hoc network, or a mesh network can be used. Also, as short-distance wireless audio and visual (AV) transmission communication for use in the communication system 100, for example, Wi-Fi CERTIFIED Miracast (the title of the technical specification: Wi-Fi Display) can be used. Note that Wi-Fi CERTIFIED Miracast is a mirroring technique of transmitting audio or a display image played back on one terminal to another terminal using the Wi-Fi Direct or TDLS technique so that the audio or image data is similarly output on the other terminal.

Also, in Wi-Fi CERTIFIED Miracast, User Input Back Channel (UIBC) is implemented on Transmission Control Protocol/Internet Protocol (TCP/IP). UIBC is a technique of transmitting information about operation of an input apparatus, such a mouse, a keyboard, or the like, from one terminal to another terminal. Note that, instead of Wi-Fi CERTIFIED Miracast, other remote desktop software (e.g., Virtual Network Computing (VNC)) may be applied.

Note that FIG. 1 shows an example in which the information processing apparatus 102 and the information processing apparatus 200 are an information processing apparatus (source apparatus) that is a transmitter which transmits data, and the information processing apparatus 101 and the information processing apparatus 300 are an information processing apparatus (sink apparatus) that is a receiver which receives data. Also, FIG. 1 shows an example in which the control apparatus 400 is a band control apparatus which controls the band of the entire system.

Thus, when there are a plurality of source apparatuses and a plurality of sink apparatuses, one source apparatus can concurrently transmit a stream toward a plurality of sink apparatuses in accordance with Wi-Fi CERTIFIED Miracast. For example, as indicated by arrows 107 and 108, the information processing apparatus 200 can concurrently transmit a stream to both the information processing apparatus 101 and the information processing apparatus 300 in accordance with Wi-Fi CERTIFIED Miracast.

Also, when there are a plurality of source apparatuses and a plurality of sink apparatuses, a plurality of source apparatuses can concurrently transmit a stream to one sink apparatus in accordance with Wi-Fi CERTIFIED Miracast. For example, as shown in arrows 108 and 109, the information processing apparatus 300 can receive streams which are concurrently transmitted by both the information processing apparatus 102 and the information processing apparatus 200 in accordance with Wi-Fi CERTIFIED Miracast.

Also, in the embodiment of the present technology, an example is shown in which at least one of a plurality of apparatuses included in the communication system 100 includes two wireless communication units (devices). One of the two wireless communication units is caused to operate as a peer-to-peer (P2P)-group owner (GO) while the other is caused to operate as a P2P-client.

FIG. 1 shows an example in which two wireless communication units (a first wireless communication unit 310 and a second wireless communication unit 320) compliant with IEEE 802.11 are included in the information processing apparatus 300. In this case, the first wireless communication unit 310 is caused to operate as a P2P-GO while the second wireless communication unit 320 is caused to operate as a P2P-client. Also, it is assumed that the first wireless communication unit 310 does not support Wi-Fi CERTIFIED Miracast. Here, when the first wireless communication unit 310 does not support Wi-Fi CERTIFIED Miracast, no Wi-Fi Direct (WFD)-information element (IE) is given to a frame (e.g., a beacon). Also, it is assumed that the second wireless communication unit 320 supports Wi-Fi CERTIFIED Miracast. Here, when the second wireless communication unit 320 supports Wi-Fi CERTIFIED Miracast, a frame containing a WFD-IE is transmitted.

Also, as indicated by arrow 110, the first wireless communication unit 310 and the second wireless communication unit 320 are always ready to perform communication. For example, Wi-Fi Direct connection can be always kept established between the first wireless communication unit 310 and the second wireless communication unit 320. The first wireless communication unit 310 and the second wireless communication unit 320 communicate with each other by exchanging wireless LAN frames between the first wireless communication unit 310 and the second wireless communication unit 320.

Note that other communication techniques may be used to enable the first wireless communication unit 310 and the second wireless communication unit 320 to communicate with each other. For example, the first wireless communication unit 310 and the second wireless communication unit 320 can be enabled to communicate with each other in accordance with a specification other than IEEE 802.11. For example, the first wireless communication unit 310 and the second wireless communication unit 320 can be enabled to perform communication using a wired bus. This wired bus is, for example, a wired LAN (e.g., Ethernet (registered trademark)), Universal Serial Bus (USB), or Inter-Integrated Circuit (I2C). Also, for example, a shared memory or the like may be used to cause the first wireless communication unit 310 and the second wireless communication unit 320 to exchange data directly. Thus, Wi-Fi Direct connection communication, or communication corresponding to Wi-Fi Direct (communication compliant with a specification other than IEEE 802.11) is implemented between the first wireless communication unit 310 and the second wireless communication unit 320.

Note that the first wireless communication unit 310 and the second wireless communication unit 320 may be logically different devices. Therefore, the first wireless communication unit 310 and the second wireless communication unit 320 may be implemented on the same physical device.

For example, each apparatus initially connects to the first wireless communication unit 310 using Wi-Fi Direct. For example, as indicated by dotted lines 103 to 106, each apparatus establishes Wi-Fi Direct connection with the first wireless communication unit 310. After establishing this connection, each apparatus searches for an apparatus with which that apparatus desires to establish Wi-Fi CERTIFIED Miracast connection, and starts a session, in accordance with the Tunneled Direct Link Setup (TDLS) standard.

Here, when an apparatus desires to establish Wi-Fi CERTIFIED Miracast connection with the information processing apparatus 300, that apparatus should establish Wi-Fi CERTIFIED Miracast connection with the second wireless communication unit 320. Specifically, as indicated by arrows 108 and 109, when the information processing apparatus 102 and the information processing apparatus 200 establish Wi-Fi CERTIFIED Miracast connection with the information processing apparatus 300, the information processing apparatus 102 and the information processing apparatus 200 connect to the second wireless communication unit 320.

Thus, in FIG. 1, dotted lines 103 to 106 indicate Wi-Fi Direct connection. The Wi-Fi Direct connection allows for exchange of information about each apparatus, information about a stream, a band control signal, and the like.

Also, in FIG. 1, arrows 107 to 109 indicate Wi-Fi CERTIFIED Miracast connection (Wi-Fi CERTIFIED Miracast over TDLS). The Wi-Fi CERTIFIED Miracast connection allows for transmission of a stream (an image stream, an audio stream).

Thus, a Wi-Fi CERTIFIED Miracast session by TDLS can be generated without providing an access point (AP) in the environment. Also, after the session generation, a frequency and a channel for use in each session can be dynamically changed using the channel switch mechanism of TDLS.

Although, in the communication system 100, the apparatuses can be connected in manners other than those indicated by dotted lines 103 to 106 and arrows 107 to 110, FIG. 1 does not show dotted lines or arrows indicating such connections.

[Configuration Examples of Information Processing Apparatus (Source Apparatus)]

Figure 2:
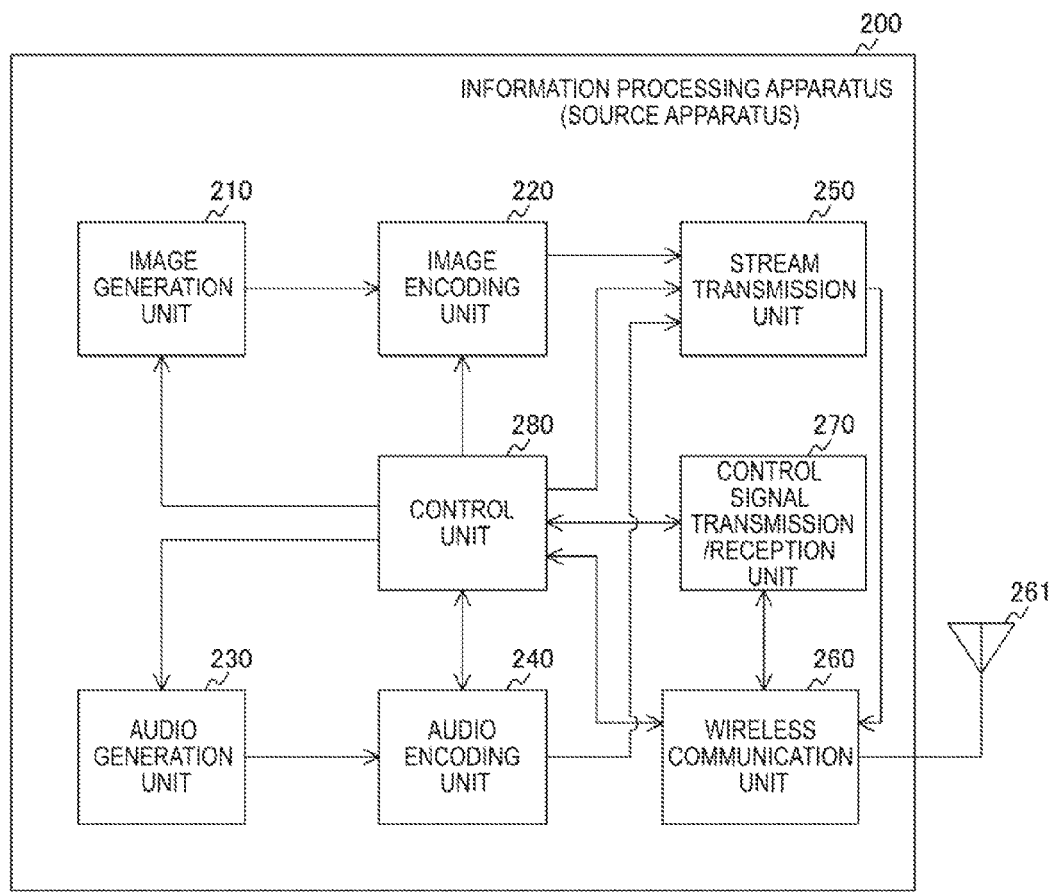
FIG. 2 is a block diagram showing a functional configuration example of an information processing apparatus 200 in an embodiment of the present technology.

FIG. 2 is a block diagram showing a functional configuration example of the information processing apparatus 200 in the embodiment of the present technology. Note that a functional configuration involved with wireless communication of the information processing apparatus 102 is substantially the same as that of the information processing apparatus 200. Therefore, in the embodiment of the present technology, only the information processing apparatus 200 will be described, and the information processing apparatus 102 will not be described.

Also, in FIG. 2, only a general configuration of an information processing apparatus (source apparatus) supporting Wi-Fi CERTIFIED Miracast will be shown, and other portions will not be shown or described in detail.

The information processing apparatus 200 includes an image generation unit 210, an image encoding unit 220, an audio generation unit 230, an audio encoding unit 240, a stream transmission unit 250, a wireless communication unit 260, an antenna 261, a control signal transmission/reception unit 270, and a control unit 280.

The image generation unit 210 generates image data (image signal (video signal)) which is to be output, and outputs the generated image data to the image encoding unit 220, under the control of the control unit 280. For example, the image generation unit 210 can capture an image displayed on a display screen of a display apparatus (e.g., a display included in the information processing apparatus 200, or an external display apparatus), to generate image data. Also, for example, the image generation unit 210 may employ image data which is generated by an imaging apparatus (e.g., a lens, an imaging element, a signal processing circuit) capturing an image of a subject. The image data thus generated is to be transmitted to another information processing apparatus (e.g., the information processing apparatus 300).

The image encoding unit 220 encodes the image data generated by the image generation unit 210, and outputs the encoded image data to the stream transmission unit 250, under the control of the control unit 280. For example, the image encoding unit 220 performs compression/encoding using H.264 in Wi-Fi CERTIFIED Miracast. Also, the image encoding unit 220 may use high-efficient encoding when necessary.

The audio generation unit 230 generates audio data (audio signal) to be output, and outputs the generated audio data to the audio encoding unit 240, under the control of the control unit 280. For example, the audio generation unit 230 can capture sound output from an audio output apparatus (e.g., a speaker included in the information processing apparatus 200, an external speaker) to generate audio data. Also, for example, the audio generation unit 230 may use audio data which is obtained by acquiring ambient sound using an audio acquisition unit (e.g., a microphone). The audio data thus generated is to be transmitted to another information processing apparatus (e.g., the information processing apparatus 300).

The audio encoding unit 240 encodes the audio data generated by the audio generation unit 230, and outputs the encoded audio data to the stream transmission unit 250, under the control of the control unit 280. For example, the audio encoding unit 240 can perform encoding using a linear pulse code modulation (LPCM) technique in Wi-Fi CERTIFIED Miracast. Also, for example, the audio encoding unit 240 can perform compression/encoding using a high-efficiency encoding technique in Wi-Fi CERTIFIED Miracast. Note that the high-efficiency encoding is, for example, Advanced Audio Coding Low Complexity (AAC-LC) or Audio Code number 3 (AC-3). Thus, the audio encoding unit 240 can employ high-efficiency encoding when necessary.

The stream transmission unit 250 generates a stream by multiplexing the image data output by the image encoding unit 220 and the audio data output by the audio encoding unit 240, under the control of the control unit 280. Thereafter, the stream transmission unit 250 performs a transmission process of transmitting the generated stream from the antenna 261 through the wireless communication unit 260. Thus, the generated stream is transmitted to a stream reception unit of another information processing apparatus (e.g., a stream reception unit 330 of the information processing apparatus 300) through the wireless communication unit 260 and the antenna 261.

Note that FIG. 2 shows an example in which the information processing apparatus 200 transmits both mage data and audio data. Note that the present technology can be similarly applied to an information processing apparatus (source apparatus) which transmits only either of image data and audio data. For example, an information processing apparatus (source apparatus) which transmits only image data may not include the audio generation unit 230 or the audio encoding unit 240. Also, for example, an information processing apparatus (source apparatus) which transmits only audio data may not include the image generation unit 210 or the image encoding unit 220.

The control signal transmission/reception unit 270 exchanges signals involved with various controls, with a control signal transmission/reception unit of another information processing apparatus (e.g., a control signal transmission/reception unit 380 (shown in FIG. 3) of the information processing apparatus 300), under the control of the control unit 280. Thereafter, the control signal transmission/reception unit 270 outputs the exchanged control signals (e.g., information exchanged with the information processing apparatus 300) to the control unit 280.

For example, the control signal transmission/reception unit 270 exchanges a signal involved with the control of a Wi-Fi CERTIFIED Miracast session, with the control signal transmission/reception unit 380 of the information processing apparatus 300. Also, for example, the control signal transmission/reception unit 270 transmits and receives a signal involved with band control to and from a control signal transmission/reception unit 430 (shown in FIG. 4) of the control apparatus 400, and transmits information about the performance of the information processing apparatus 200, information about a stream being transmitted, or the like.

The wireless communication unit 260 transmits and receives each item of information (e.g., image data and audio data) to and from another information processing apparatus through the antenna 261 by wireless communication, under the control of the control unit 280. For example, the wireless communication unit 260 transmits and receives each item of information to and from the first wireless communication unit 310 and the second wireless communication unit 320 (shown in FIG. 3) of the information processing apparatus 300, and a wireless communication unit 410 (shown in FIG. 4) of the control apparatus 400.

For example, when the process of transmitting image data is performed, image data generated by the image generation unit 210 is encoded by the image encoding unit 220, and the encoded image data (image stream) is transmitted from the antenna 261 through the wireless communication unit 260. Also, for example, the wireless communication unit 260 performs real-time image transmission with another information processing apparatus in accordance with the Wi-Fi CERTIFIED Miracast specification.

Also, the wireless communication unit 260 can transmit and receive each item of information to and from another information processing apparatus (e.g., the information processing apparatus 300) using a plurality of channels. Thus, when a source apparatus has the function of performing transmission and reception using a plurality of channels, a sink apparatus (e.g., the information processing apparatus 300) can control which of the channels is to be used by each source apparatus.

The control unit 280 initializes each unit of the information processing apparatus 200 or controls the entire apparatus. For example, the control unit 280 controls the generation, ending, and the like of a Wi-Fi CERTIFIED Miracast session, according to a control signal received by the control signal transmission/reception unit 270. Also, for example, the control unit 280 instructs the wireless communication unit 260 to change frequencies or channels for wireless communication, or instructs the image encoding unit 220 and the audio encoding unit 240 to change bands.

[Configuration Examples of Information Processing Apparatus (Sink Apparatus)]

Figure 3:
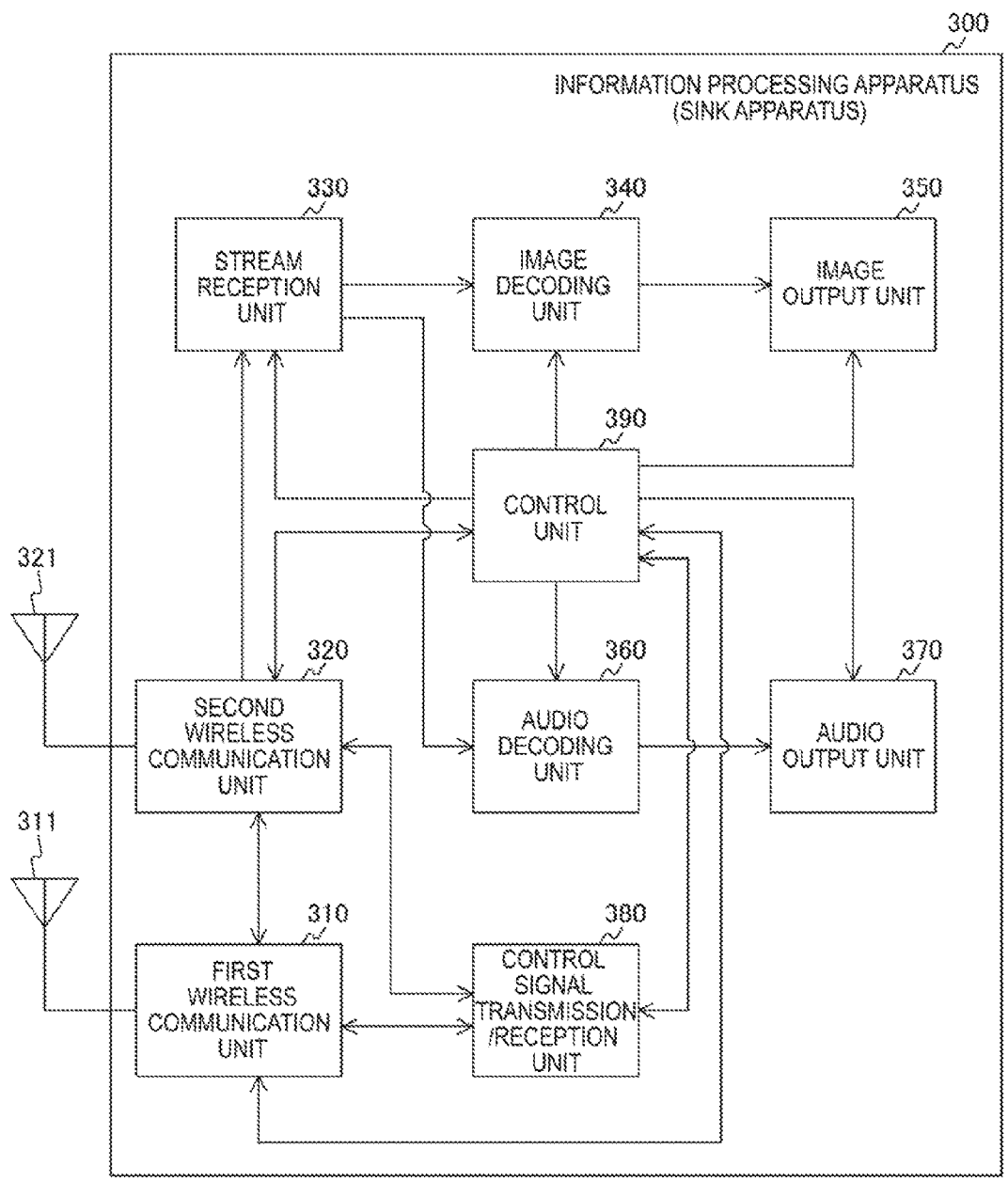
FIG. 3 is a block diagram showing a functional configuration example of an information processing apparatus 300 in an embodiment of the present technology.

FIG. 3 is a block diagram showing a functional configuration example of the information processing apparatus 300 in the embodiment of the present technology. Note that a functional configuration involved with wireless communication of the information processing apparatus 101 is substantially the same as that of the information processing apparatus 300, except that a single wireless communication unit is included. Therefore, in the embodiment of the present technology, only the information processing apparatus 300 will be described, and the information processing apparatus 101 will not be described.

Also, in FIG. 3, only a general configuration of the information processing apparatus (sink apparatus) supporting Wi-Fi CERTIFIED Miracast is shown, and other portions are not shown or described in detail.

The information processing apparatus 300 includes a first wireless communication unit 310, an antenna 311, a second wireless communication unit 320, an antenna 321, a stream reception unit 330, an image decoding unit 340, an image output unit 350, an audio decoding unit 360, an audio output unit 370, a control signal transmission/reception unit 380, and a control unit 390.

The first wireless communication unit 310 transmits and receives each item of information (e.g., a control signal) to and from another information processing apparatus (e.g., the information processing apparatus 200, the control apparatus 400) through the antenna 311 by wireless communication, under the control of the control unit 390. For example, the first wireless communication unit 310 transmits and receives a control signal to and from a source apparatus (e.g., the information processing apparatus 200), and transmits and receives a control signal to and from a control apparatus (e.g., the control apparatus 400).

The second wireless communication unit 320 transmits and receives each item of information (e.g., image data and audio data) to and from another information processing apparatus (e.g., the information processing apparatus 200, the control apparatus 400) through the antenna 321 by wireless communication, under the control of the control unit 390. For example, the second wireless communication unit 320 receives a stream transmitted from a source apparatus (e.g., the information processing apparatus 200), and transmits and receives a control signal to and from a source apparatus.

For example, when the process of receiving image data is performed, image data received by the antenna 321 is decoded by the image decoding unit 340 through the second wireless communication unit 320 and the stream reception unit 330. Thereafter, the decoded image data is supplied to the image output unit 350, and an image corresponding to the decoded image data is output from the image output unit 350. Specifically, the image corresponding to the decoded image data is displayed on the image output unit 350 (e.g., a display apparatus). Also, for example, the second wireless communication unit 320 performs real-time image transmission with another information processing apparatus in accordance with the Wi-Fi CERTIFIED Miracast specification.

Thus, the first wireless communication unit 310 transmits and receives a control signal to and from a source apparatus, and transmits and receives a control signal to a control apparatus. The second wireless communication unit 320 receives a stream transmitted from a source apparatus, and transmits and receives a control signal to and from a source apparatus.

Also, the first wireless communication unit 310 and the second wireless communication unit 320 may transmit and receive each items of information to and from another information processing apparatus using a plurality of channels.

Also, the first wireless communication unit 310 and the second wireless communication unit 320 exchange each item of information with each other under the control of the control unit 390. Thus, when the first wireless communication unit 310 and the second wireless communication unit 320 communicate with each other, the communication can be performed by utilizing wireless communication (e.g., a wireless LAN) as described above. Also, the communication may be performed using an internal bus between the first wireless communication unit 310 and the second wireless communication unit 320. Also, a configuration may be provided in which a single wireless communication unit is used to concurrently execute the two functions of the first wireless communication unit 310 and the second wireless communication unit 320. Specifically, the first wireless communication unit 310 and the second wireless communication unit 320 can exchange information with each other by communication through Wi-Fi Direct connection, or communication corresponding to communication through Wi-Fi Direct connection in accordance with a specification other than IEEE 802.11.

Also, as described above, the first wireless communication unit 310 operates as a P2P-GO when data is transmitted and received to and from a source apparatus by wireless communication, where there is one-to-one direct connection between the sink apparatus and the source apparatus. Also, the second wireless communication unit 320 serves as a P2P-client and connects to the first wireless communication unit 310, and connects to a source apparatus in accordance with the Wi-Fi CERTIFIED Miracast specification, and transmits and receives a stream to and from the source apparatus. In this case, the second wireless communication unit 320 generates a direct link with the source apparatus using a communication scheme specified in the IEEE 802.11z specification, and transmits and receives a stream.

The stream reception unit 330 receives a stream (e.g., an image stream, an audio stream) transmitted from a source apparatus (e.g., the information processing apparatus 200) through the second wireless communication unit 320, under the control of the control unit 390. Also, when image data and audio data are multiplexed in the received stream, the stream reception unit 330 separates the stream into the image data and the audio data. Thereafter, the stream reception unit 330 outputs the image data to the image decoding unit 340, and outputs the audio data to the audio decoding unit 360.

The image decoding unit 340 decodes an image stream transmitted from another information processing apparatus (e.g., the information processing apparatus 200), and outputs the decoded image data to the image output unit 350, under the control of the control unit 390. Also, the image decoding unit 340 decodes an image stream which has been subjected to high-efficiency encoding in a source apparatus, in accordance with the high-efficiency encoding scheme.

The image output unit 350 outputs and provides image data decoded by the image decoding unit 340 to the user. For example, the image output unit 350 can display an image based on the decoded image data on a display apparatus (e.g., a display included in the information processing apparatus 300, an external display apparatus). Note that when an image based on the decoded image data is displayed on an external display apparatus, the image output unit 350 outputs the decoded image data to the external apparatus through a communication interface, for example. Note that, as the communication interface, for example, High-Definition Multimedia Interface (HDMI (registered trademark)) can be used. Also, for example, the image output unit 350 may record the decoded image data as a content (file data) to a recording medium (not shown).

The audio decoding unit 360 decodes an audio stream transmitted from another information processing apparatus (e.g., the information processing apparatus 200), and outputs the decoded audio data to the audio output unit 370, under the control of the control unit 390. Also, the audio decoding unit 360 decodes an audio stream which has been subjected to high-efficiency encoding in a source apparatus, in accordance with the high-efficiency encoding scheme.

The audio output unit 370 outputs and provides audio data decoded by the audio decoding unit 360 to the user. For example, the audio output unit 370 can output sound based on the decoded audio data from an audio output apparatus (e.g., a speaker included in the information processing apparatus 300, an external audio output apparatus). Note that when sound based on the decoded audio data are output from an external audio output apparatus, the audio output unit 370 outputs the decoded audio data to an external apparatus through a communication interface (e.g., HDMI), for example. Also, for example, the audio output unit 370 may record the decoded audio data as a content (file data) to a recording medium (not shown).

Here, it is assumed that there are a sink apparatus which supports only reception of an image are a sink apparatus which supports only reception of audio. For example, in the case of a sink apparatus which supports only reception of an image, the audio decoding unit 360 and the audio output unit 370 may not be provided. Similarly, in the case of a sink apparatus which supports only reception of audio, the image decoding unit 340 and the image output unit 350 may not be provided.

The control signal transmission/reception unit 380 exchanges signals involved with various controls with a control signal transmission/reception unit of another information processing apparatus (e.g., the control signal transmission/reception unit 270 (shown in FIG. 2) of the information processing apparatus 200), under the control of the control unit 390. Thereafter, the control signal transmission/reception unit 380 outputs the exchanged control signal (e.g., information exchanged with the information processing apparatus 200) to the control unit 390.

For example, the control signal transmission/reception unit 380 exchanges a signal involved with the control of a Wi-Fi CERTIFIED Miracast session, with the control signal transmission/reception unit 270 of the information processing apparatus 200. Also, for example, the control signal transmission/reception unit 380 transmits and receives a signal involved with band control, to and from the control signal transmission/reception unit 430 (shown in FIG. 4) of the control apparatus 400, and transmits information about the performance of the information processing apparatus 300, information about the status of transmission of a stream, and the like.

The control unit 390 initializes each unit of the information processing apparatus 300 or controls the entire apparatus. For example, the control unit 390 controls generation, ending, and the like of a Wi-Fi CERTIFIED Miracast session, according to a control signal received from the control signal transmission/reception unit 380. Also, for example, the control unit 390 instructs the second wireless communication unit 320 to change frequencies or channels for wireless communication.

[Configuration Examples of Control Apparatus]

Figure 4:
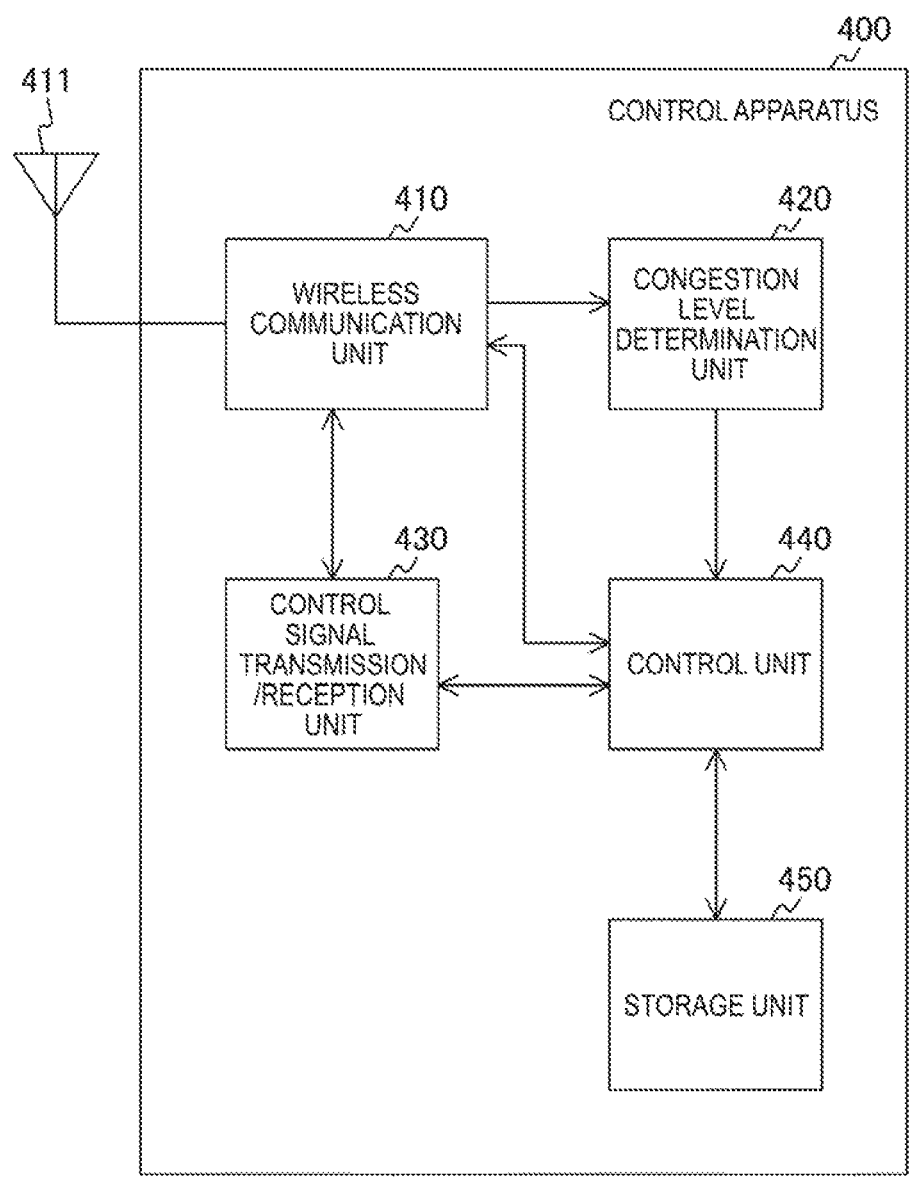
FIG. 4 is a block diagram showing a functional configuration example of a control apparatus 400 in an embodiment of the present technology.

FIG. 4 is a block diagram showing a functional configuration example of the control apparatus 400 in the embodiment of the present technology.

The control apparatus 400 includes a wireless communication unit 410, an antenna 411, a congestion level determination unit 420, a control signal transmission/reception unit 430, a control unit 440, and a storage unit 450. Also, the control apparatus 400 is a band control apparatus which controls the band of the entire system.

The wireless communication unit 410 transmits and receives each item of information (e.g., a control signal) to and from another information processing apparatus (e.g., the information processing apparatus 200, the information processing apparatus 300) through the antenna 411 by utilizing wireless communication, under the control of the control unit 440. For example, the wireless communication unit 410 transmits and receives a control signal to and from the wireless communication unit 260 of the information processing apparatus 200 or the first wireless communication unit 310 of the information processing apparatus 300. Also, the wireless communication unit 410 regularly measures noise in packets transmitted by an information processing apparatus (e.g., the information processing apparatus 200, the information processing apparatus 300) which is transmitting and receiving data, the environment, and the like. Also, the wireless communication unit 410 regularly measures noise in packets transmitted by an apparatus other than an information processing apparatus (e.g., the information processing apparatus 200, the information processing apparatus 300) which is transmitting and receiving data, the environment, and the like.

The congestion level determination unit 420 estimates the wireless congestion level of each channel, on the basis of information about radio waves, noise, and the like observed by the wireless communication unit 410, and outputs the result of the estimation to the control unit 440, under the control of the control unit 440. For example, a technique of calculating the congestion level using the clear channel assessment (CCA) function for use in carrier sense can be employed. In this calculation technique, it is calculated how long a wireless channel is occupied (BUSY) per unit time, and the congestion level is determined on the basis of the proportion. For example, it can be determined that the congestion level is higher as the proportion increases.

The control signal transmission/reception unit 430 exchanges signals involved with various controls with another information processing apparatus (e.g., the information processing apparatus 200, the information processing apparatus 300), under the control of the control unit 440. Thereafter, the control signal transmission/reception unit 430 outputs the exchanged control signal to the control unit 440.

For example, the control signal transmission/reception unit 430 transmits and receives a signal involved with band control to and from the control signal transmission/reception unit 270 (shown in FIG. 2) of the information processing apparatus 200 or the control signal transmission/reception unit 380 (shown in FIG. 3) of the information processing apparatus 300. Also, for example, the control signal transmission/reception unit 430 transmits and receives information about the performance of each apparatus to and from the control signal transmission/reception unit 270 of the information processing apparatus 200 and the control signal transmission/reception unit 380 of the information processing apparatus 300. Also, for example, the control signal transmission/reception unit 430 receives information about a stream which is being transmitted, from each source apparatus. Also, for example, the control signal transmission/reception unit 430 receives information about the status of transmission of a stream, from a sink apparatus.

Specifically, the control signal transmission/reception unit 430 acquires information for use in determination for control of transmission and reception of a stream between a plurality of information processing apparatuses in accordance with the Wi-Fi CERTIFIED Miracast specification. This information is, for example, information about the performance of each information processing apparatus (constraint information about constraint conditions for transmission and reception of a stream), information about the status of transmission and reception of a stream, or information about a wireless environment in which transmission and reception of a stream are performed. Examples of these items of information are shown in FIG. 5 to FIG. 7. Note that the control signal transmission/reception unit 430 is an example of an acquisition unit as set forth in the appended claims.

The control unit 440 initializes each unit of the control apparatus 400, and controls the entire apparatus. For example, the control unit 440 determines which stream is to be transmitted in which frequency band and in which channel, and at this time, at what bit rate. For example, the control unit 440 can perform this determination on the basis of the determination result (e.g., the congestion level of wireless communication) generated by the congestion level determination unit 420, or each item of information received by the control signal transmission/reception unit 430. Note that each item of information received by the control signal transmission/reception unit 430 is, for example, the performance of each apparatus, information about a stream, the status of transmission of a stream, or the like.

Also, the control unit 440 outputs the result of the determination to the control signal transmission/reception unit 430. Thereafter, the control signal transmission/reception unit 430 transmits the determination result to the control signal transmission/reception unit of a sink apparatus or a source apparatus when necessary.

Specifically, the control unit 440 controls transmission and reception of a stream between a plurality of information processing apparatuses in accordance with the Wi-Fi CERTIFIED Miracast specification, on the basis of each item of information acquired by the control signal transmission/reception unit 430. For example, the control unit 440 generates control information for controlling transmission and reception of a stream on the basis of the acquired information, and transmits the generated control information to at least one of a plurality of information processing apparatuses, thereby controlling transmission and reception of a stream. In this case, for example, the control unit 440 can generate control information for setting, in each apparatus, a frequency band and a channel which are to be used for a stream, a bit rate which is to be assigned to a stream, an image compression scheme for a stream, an audio compression scheme for a stream, and the like. Also, the control unit 440 can newly generate control information, which is triggered by the control signal transmission/reception unit 430 acquiring new information (e.g., constraint information, operation information, environment information), and transmit the newly generated control information to each information processing apparatus. For example, each time the control signal transmission/reception unit 430 acquires new information, the control unit 440 can newly generate and transmit control information to each information processing apparatus. Also, for example, if predetermined conditions are satisfied at a timing when the control signal transmission/reception unit 430 acquires new information (e.g., a deterioration in the wireless environment is greater than or equal to a threshold), the control unit 440 can newly generate and transmits control information to each information processing apparatus. Also, the control unit 440 can generate, on the basis of information (e.g., constraint information, operation information, environment information) transmitted from one apparatus, control information about another apparatus, and transmit the generated control information to the apparatus.

The storage unit 450 is a storage unit which stores information transmitted from each apparatus (a source apparatus, a sink apparatus). Also, the storage unit 450 supplies the stored information to the control unit 440. For example, the storage unit 450 stores a constraint information management table 460 (shown in FIG. 5), an operation information management table 470 (shown in FIG. 6), and an environment information management table 480 (shown in FIG. 7).

Although, in the embodiment of the present technology, an example is shown in which the control apparatus 400 has the function of determining the wireless congestion level (the congestion level determination unit 420), another apparatus (a source apparatus, a sink apparatus) may have the function of determining the wireless congestion level (the congestion level determination unit 420). In this case, the determination result (e.g., the wireless congestion level) generated by another apparatus is regularly or irregularly transmitted to the control apparatus 400.

Also, although, in the embodiment of the present technology, an example is shown in the control apparatus 400 is an independent apparatus other than a source apparatus and a sink apparatus, the function of the control apparatus may be assigned to any of a source apparatus and a sink apparatus. For example, when the function of the control apparatus 400 is assigned to the information processing apparatus 300, the function of the wireless communication unit 410 is assigned to the first wireless communication unit 310, the function of the control signal transmission/reception unit 430 is assigned to the control signal transmission/reception unit 380, and the function of the control unit 440 is assigned to the control unit 390. Also, only the congestion level determination unit 420 is added to the information processing apparatus 300. Thus, when the function of the control apparatus 400 is assigned to the information processing apparatus 300, the first wireless communication unit 310 can be used to find conditions of the wireless environment, or communicate with each apparatus on Wi-Fi Direct, for example.

Also, in the embodiment of the present technology, the control apparatus 400 integrally configured has been described as an example. Note that the embodiment of the present technology can be applied to an information processing system in which each unit included in the control apparatus 400 includes a plurality of apparatuses. For example, an information processing system which is provided on a network (e.g., cloud computing) may be assumed.

Also, although, in the embodiment of the present technology, an example is shown in which a sink apparatus (the information processing apparatus 300) includes the first wireless communication unit 310 and the second wireless communication unit 320, a source apparatus may include the first wireless communication unit 310 and the second wireless communication unit 320.

Here, information which is exchanged between each apparatus included in the communication system 100 will be described.

[Constraint Information Examples]

Each apparatus (a source apparatus, a sink apparatus) transmits information about its own performance to the control apparatus 400. Note that each apparatus's own performance information can be recognized as information (constraint information) about a constraint on that apparatus (device constraint). Also, each apparatus's own performance information (constraint information) can be recognized as information (constraint information) about the performance of a wireless communication device (e.g., a wireless LAN device) included in that apparatus. Also, it is assumed that each apparatus's own performance information (constraint information) includes information about the capability of that apparatus.

Here, each apparatus's own performance information (constraint information) includes, for example, the following (A1) to (A8):

(A1) a frequency band (e.g., 2.4 GHz, 5 GHz, 60 GHz) supported by the apparatus;

(A2) a channel supported by the apparatus;

(A3) whether or not the apparatus is capable of concurrently performing communication on a plurality of channels, and also, if the apparatus is capable of concurrently performing communication on a plurality of channels, whether or not there is a constraint on the combination of channels and the number of concurrent communications. For example, multi-channel concurrent (MCC).

(A4) a maximum physical layer (PHY) rate (e.g., 300 Mbps) available to the apparatus. Also, information related thereto (e.g., spatial multiplex number (e.g., two streams), supporting the 40-MHz bandwidth, supporting the short guard interval (GI), supporting IEEE 802.11AC).

(A5) in the case of a source apparatus, the types of an image format (video format) and an audio format supported by an encoder included in the apparatus, and the number of encoders which can run concurrently;

(A6) in the case of a sink apparatus, the resolution of a display device (or a display region), the types of an image format and an audio format supported by a decoder included in the apparatus, and the number of decoders which can run concurrently;

(A7) the maximum bit rate of a stream which can be supported (received or transmitted) by each entire apparatus; and (A8) the upper limit value of throughput of transmission and reception which can be performed by the apparatus.

Note that the above (A1) to (A8) are merely illustrative, and other information may be included in each apparatus's own performance information (constraint information) in addition to (A1) to (A8). Also, FIG. 5 shows an example of management of each apparatus's own performance information (constraint information) in the control apparatus 400.
[Content Examples of Constraint Information Management Table]

FIG. 5 is a diagram schematically showing an example of management contents of the constraint information management table 460 stored in the storage unit 450 in the embodiment of the present technology.

The constraint information management table 460 is a table for managing constraint information (each apparatus's own performance information).

For example, the control unit 440 successively records constraint information (each apparatus's own performance information) transmitted from apparatuses to be managed (a source apparatus, a sink apparatus), to the constraint information management table 460, for each apparatus (a source apparatus, a sink apparatus). For example, a media access control (MAC) address is used as identification information of each apparatus (a source apparatus, a sink apparatus).
[Transmission Timing Examples of Constraint Information]

Constraint information (each apparatus's own performance information) can be transmitted to the control apparatus 400, for example, at the following timings (B1) to (B5):

(B1) a timing before the start of transmission of a stream in accordance with Wi-Fi CERTIFIED Miracast;

(B2) a timing after the end of transmission of a stream in accordance with Wi-Fi CERTIFIED Miracast;

(B3) a timing when an attribute (e.g., a resolution) of an image transmitted in accordance with Wi-Fi CERTIFIED Miracast stream changes;

(B4) a timing when a characteristic (e.g., the resolution of a display region) of a sink apparatus changes; and (B5) a timing when the wireless congestion level changes.

Note that the above (B1) to (B5) are merely illustrative, and each apparatus's own performance information (constraint information) may be transmitted to the control apparatus 400 at other timings.
[Operation Information (Information About Stream) Examples]

A source apparatus transmits, to the control apparatus 400, information about a Wi-Fi CERTIFIED Miracast stream which is to be transmitted to a sink apparatus. Also, a source apparatus transmits, to the control apparatus 400, information about a Wi-Fi CERTIFIED Miracast stream which is operating. These can be recognized as operation information (information about a stream).

There are, for example, the following information (C1) to (C3) about a Wi-Fi CERTIFIED Miracast stream:

(C1) an approximate bit rate;

(C2) image characteristics (e.g., an image format, a resolution, a frame rate (fps)) of the stream; and (C3) audio characteristics (e.g., an audio format, a sampling frequency, the number of channels) of the stream.

Note that the above (C1) to (C3) are merely illustrative, and information about a stream may include other information in addition to (C1) to (C3). Also, FIG. 6 shows an example of management of information about a stream (operation information) in the control apparatus 400.
[Content Examples of Operation Information Management Table]

FIG. 6 is a diagram schematically showing an example of management contents of the operation information management table 470 stored in the storage unit 450 in the embodiment of the present technology.

The operation information management table 470 is a table for management of operation information (information about a Wi-Fi CERTIFIED Miracast stream).

For example, the control unit 440 successively records operation information about each apparatus (a source apparatus and a sink apparatus) which is transmitting a Wi-Fi CERTIFIED Miracast stream, to the operation information management table 470, for each apparatus. For example, the MAC addresses of a source apparatus and a sink apparatus are used as identification information of each apparatus (a source apparatus and a sink apparatus).
[Transmission Timing Examples of Operation Information]

The control apparatus 400 may regularly or irregularly send an inquiry to each source apparatus to acquire operation information (information about a Wi-Fi CERTIFIED Miracast stream). Also, a source apparatus may notify the control apparatus 400 of operation information at a timing when a Wi-Fi CERTIFIED Miracast session changes. Note that the timing at which a Wi-Fi CERTIFIED Miracast session changes is, for example, a timing when a new Wi-Fi CERTIFIED Miracast session begins. Also, the timing at which a Wi-Fi CERTIFIED Miracast session changes is, for example, a timing when the existing Wi-Fi CERTIFIED Miracast session ends. Also, the timing at which a Wi-Fi CERTIFIED Miracast session changes is, for example, a timing when the resolution of an image changes during the Wi-Fi CERTIFIED Miracast session.
[Examples of Information About Status of Transmission of Stream]

The control apparatus 400 regularly or irregularly acquires the status of transmission of a Wi-Fi CERTIFIED Miracast stream from each sink apparatus. The status of transmission of a Wi-Fi CERTIFIED Miracast stream is, for example, the rate of loss of real-time transport protocol (RTP) packets, or the fluctuation in the time of arrival of RTP packets.
[Environment Information Examples]

The control apparatus 400 monitors conditions of the wireless environment in the system (e.g., the congestion level of each channel). Note that another apparatus may monitor conditions of the wireless environment in the system instead of the control apparatus 400. For example, any apparatus (a source apparatus, a sink apparatus) in the system performs the monitoring, and notifies the control apparatus 400 of the result of the monitoring. Note that information about conditions of the wireless environment (environment information) can be recognized as information about the wireless environment, or information about the congestion level.

Note that the above environment information is merely illustrative, and may include other information. Also, FIG. 7 shows an example of management of the environment information in the control apparatus 400.
[Content Examples of Environment Information Management Table]

FIG. 7 is a diagram schematically showing an example of management contents of the environment information management table 480 stored in the storage unit 450 in the embodiment of the present technology.

The environment information management table 480 is a table for managing environment information.

For example, the control unit 440 successively records congestion information generated by the congestion level determination unit 420 as environment information to the environment information management table 480 for each channel. Also, past environment information is recorded as history information to the environment information management table 480 at predetermined intervals (e.g., 5-second intervals).

[Communication Control Examples]

The control unit 440 of the control apparatus 400 determines a frequency band or a channel which is to be used by each Wi-Fi CERTIFIED Miracast session, on the basis of these items of information. For example, the control unit 440 of the control apparatus 400 determines a frequency band or a channel which is to be used by each Wi-Fi CERTIFIED Miracast session so that a wireless band can be utilized as effectively as possible, and the band is appropriately distributed to the entire system. Thereafter, the control unit 440 of the control apparatus 400 notifies each apparatus (a source apparatus, a sink apparatus) of information about the determination.

Also, on the basis of the notification from the control apparatus 400, each apparatus changes an operating frequency or a channel using the TDLS channel switch mechanism.

Also, the control apparatus 400 specifies a parameter for a Wi-Fi CERTIFIED Miracast stream for each source apparatus when necessary. Here, the parameter for a Wi-Fi CERTIFIED Miracast stream is, for example, a maximum bit rate assigned to the stream, each item of information about an image of the stream, or each item of information about audio of the stream.

Each item of information about an image of a stream is, for example, an image format (e.g., a compression scheme), a parameter, or a resolution of the stream. Also, each item of information about audio of a stream is, for example, an audio format (e.g., a compression scheme), a parameter, or the number of channels.

Also, each source apparatus changes channels used or adjusts the bit rate of a stream on the basis of a parameter specified by the control apparatus 400.

Here, for parameters (e.g., a frequency band, a wireless channel, an image format or resolution, an audio format or the number of channels), for example, a calculation technique of using an evaluation function can be employed. For example, an evaluation function having a parameter (input) such as the bit rate of each Wi-Fi CERTIFIED Miracast stream, an image resolution, an audio sampling frequency or the number of channels, a data loss rate in wireless transmission or a fluctuation in transmission, or the like, is previously specified. Thereafter, the control unit 440 of the control apparatus 400 searches constraint information (constraint conditions) about each apparatus for a combination of parameters such as a frequency band, a wireless channel, an image format or resolution, an audio format or the number of channels, and the like which maximizes the output value of the evaluation function. Thereafter, the control unit 440 of the control apparatus 400 determines a parameter combination which maximizes the output value of the evaluation function. Note that the output of the evaluation function may represent, for example, the degree of utilization of a wireless band, the degree of satisfaction of the user using the system, or the like.

Note that, in the embodiment of the present technology, it is assumed that the notification from the control apparatus 400 to each apparatus (a source apparatus, a sink apparatus) is transmitted/received using a Wi-Fi Direct connection link instead of TDLS. Specifically, transmission and reception are performed through a P2P-GO.

Similarly, in the embodiment of the present technology, it is assumed that transmission of each item of information is transmitted/received from each apparatus (a source apparatus, a sink apparatus) to the control apparatus 400 using a Wi-Fi Direct connection link instead of TDLS.

[Communication Examples]

Figure 8:
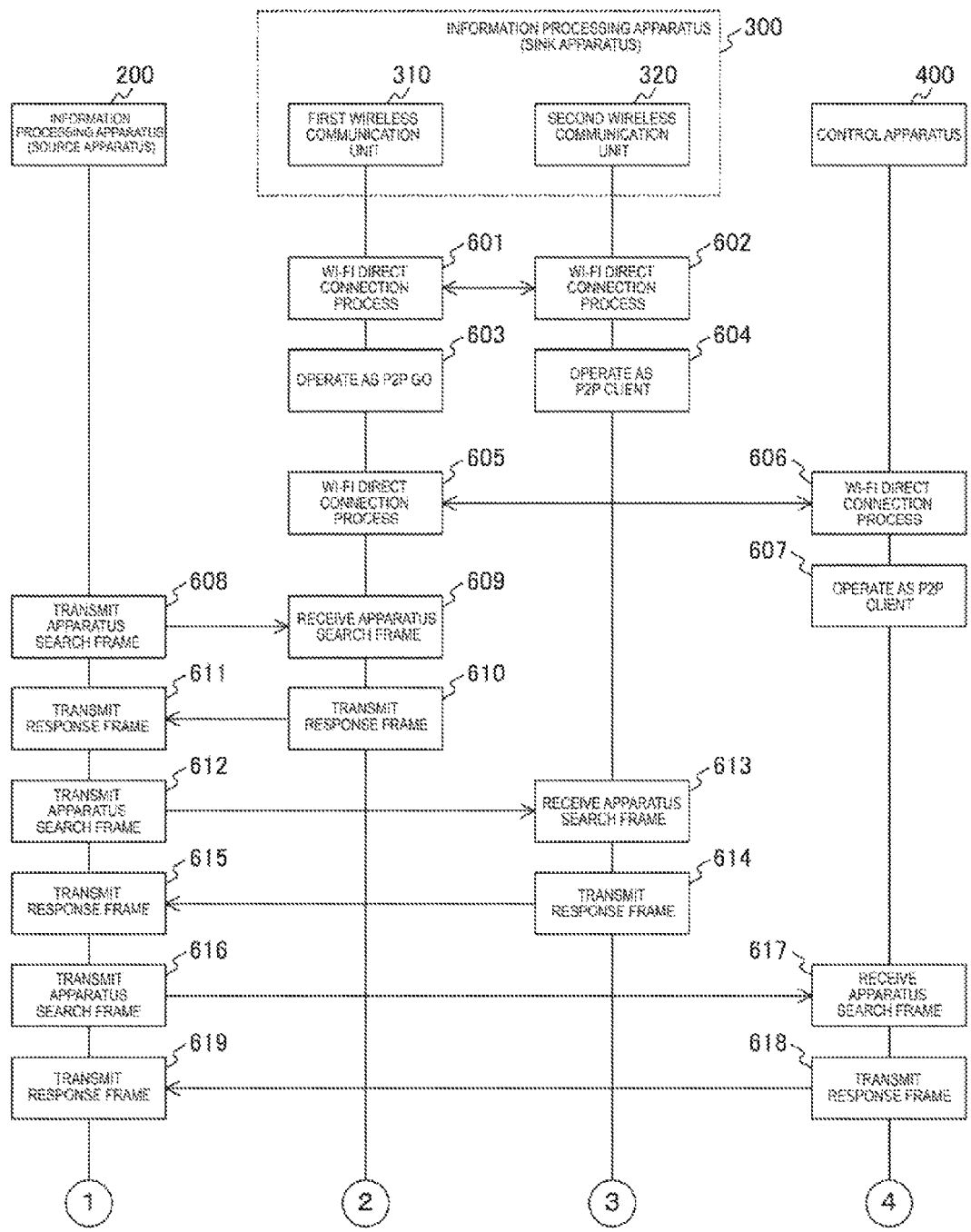
FIG. 8 is a sequence chart showing a communication process example between each apparatus included in a communication system 100 in an embodiment of the present technology.
Figure 9:
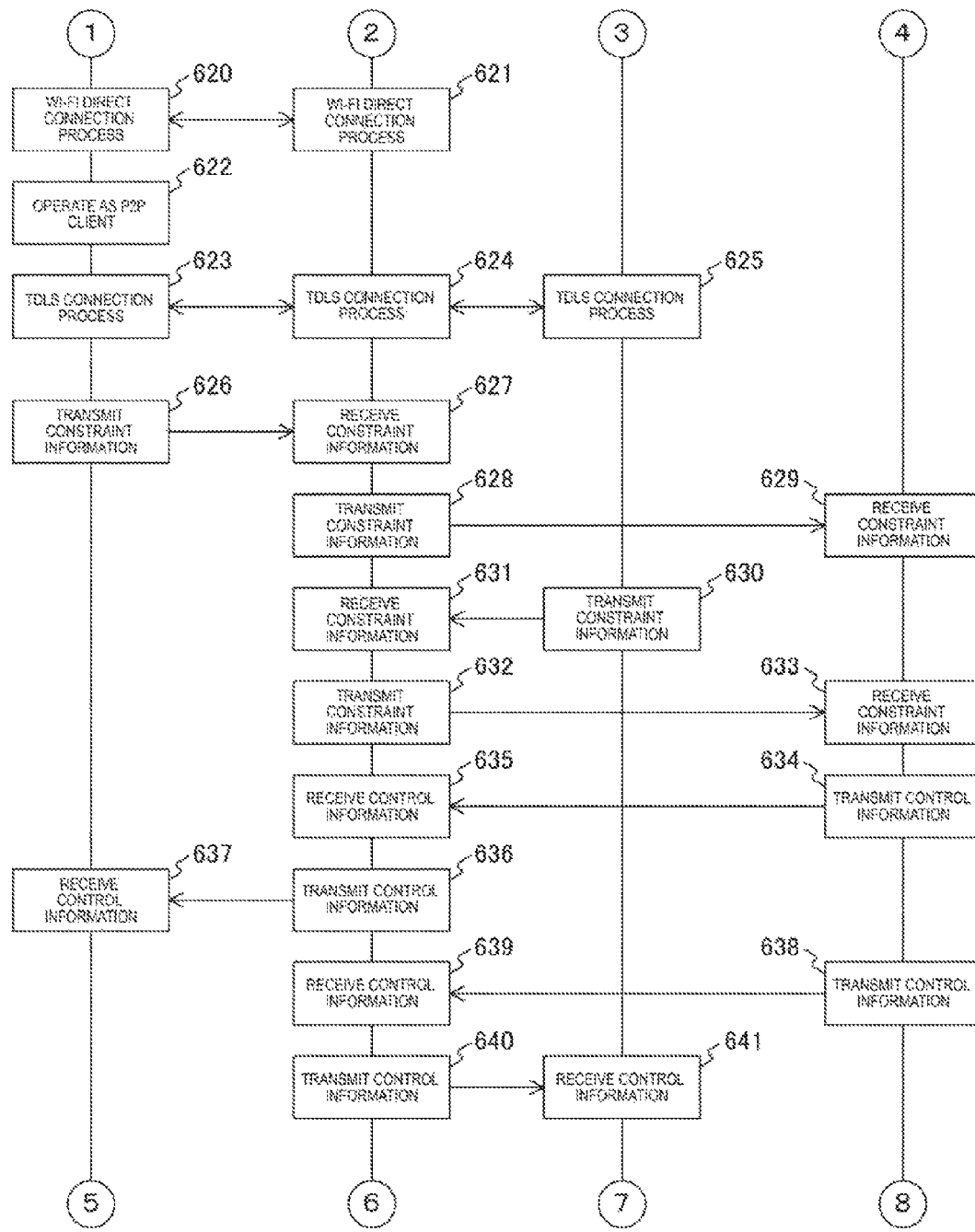
FIG. 9 is a sequence chart showing a communication process example between each apparatus included in a communication system 100 in an embodiment of the present technology.
Figure 10:
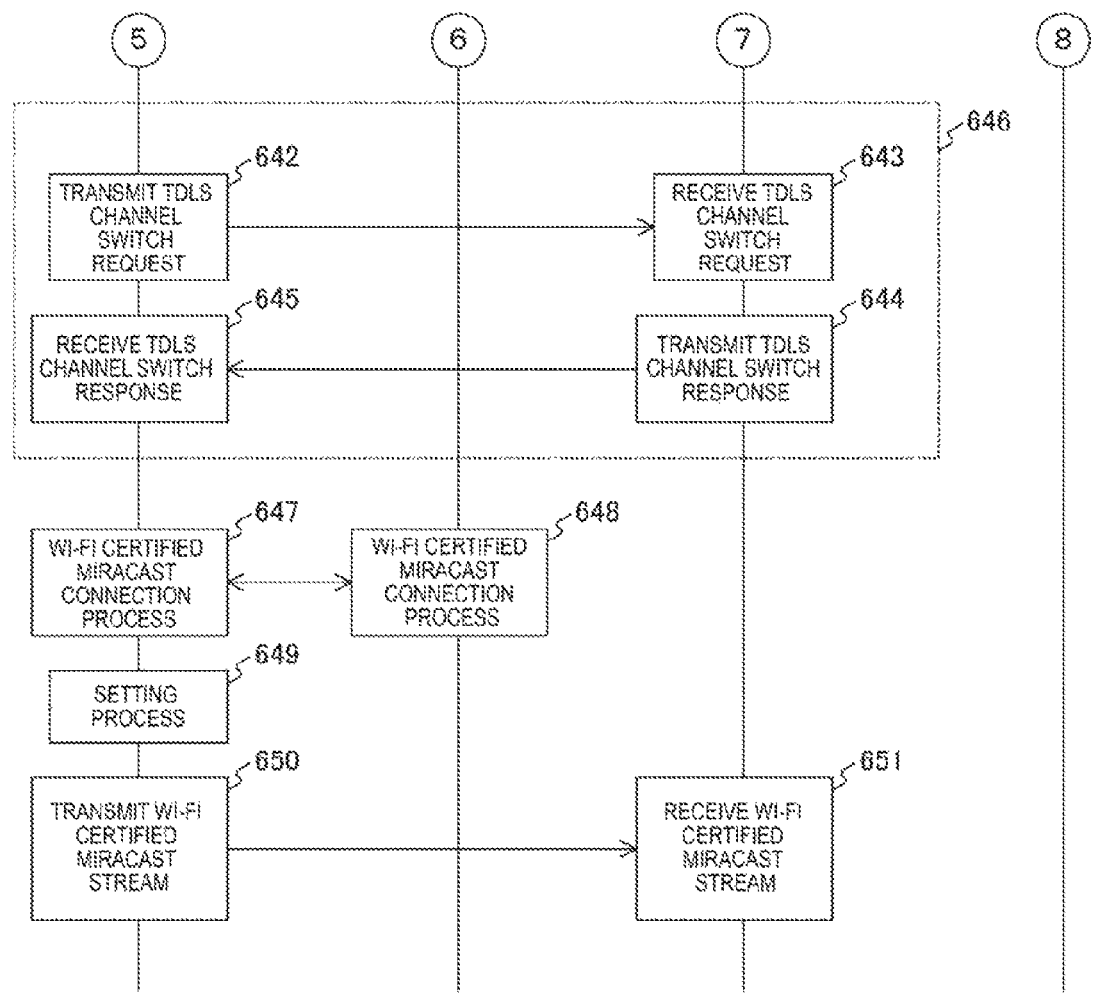
FIG. 10 is a sequence chart showing a communication process example between each apparatus included in a communication system 100 in an embodiment of the present technology.

FIG. 8 to FIG. 10 are sequence charts showing communication process examples between each apparatus included in the communication system 100 in the embodiment of the present technology. Note that FIG. 8 to FIG. 10 show communication process examples between the information processing apparatus (source apparatus) 200, the information processing apparatus (sink apparatus) 300, and the control apparatus 400.

Also, FIG. 8 to FIG. 10 show communication process examples in which the information processing apparatus (source apparatus) 200 finds the information processing apparatus (sink apparatus) 300, establishes a Wi-Fi CERTIFIED Miracast session, and starts transmission of a stream.

Also, FIG. 8 to FIG. 10 show examples in which Wi-Fi Direct communication is performed between the first wireless communication unit 310 and the second wireless communication unit 320 in the information processing apparatus (sink apparatus) 300.

Initially, in the information processing apparatus 300, a Wi-Fi Direct connection process is performed between the first wireless communication unit 310 and the second wireless communication unit 320 (601, 602). Thereafter, the first wireless communication unit 310 operates as a P2P-GO (603), and the second wireless communication unit 320 operates as a P2P-client (604). Note that when the first wireless communication unit 310 and the second wireless communication unit 320 are connected together by a technique (e.g., a wired LAN, USB, I2C, a shared memory) other than Wi-Fi Direct connection, initialization for the connection is performed (601, 602).

Also, the control unit 440 of the control apparatus 400 performs a Wi-Fi Direct connection process with respect to the first wireless communication unit 310 of the information processing apparatus 300 (605, 606). Thereafter, the control apparatus 400 operates as a P2P-client (607).

Also, the information processing apparatus 200 transmits an apparatus search frame (probe request) to each apparatus (608, 609, 612, 613, 616, 617). Each apparatus transmits a response frame (probe response) with respect to the apparatus search frame (probe request) (610, 611, 614, 615, 618, 619).

Here, as described above, the second wireless communication unit 320 of the information processing apparatus 300 supports Wi-Fi CERTIFIED Miracast. Therefore, the second wireless communication unit 320 of the information processing apparatus 300 transmits a response frame (probe response) containing a WFD-IE (614, 615). As a result, the control unit 280 of the information processing apparatus 200 acquires the WFD-IE contained in the response frame, and can thereby recognize that the second wireless communication unit 320 of the information processing apparatus 300 supports Wi-Fi CERTIFIED Miracast.

Also, the second wireless communication unit 320 of the information processing apparatus 300 sets the preferred connectivity (PC) bit in a WFD device information subelement included in the WFD-IE to one. As a result, the information processing apparatus 200 acquires the value (1) of the PC bit, and can thereby recognize that the second wireless communication unit 320 of the information processing apparatus 300 supports TDLS.

Also, the second wireless communication unit 320 of the information processing apparatus 300 incorporates the address of a currently connected P2P-GO into an associated basic service set identifier (BSSID) subelement included in the WFD-IE. Specifically, the address of the first wireless communication unit 310 of the information processing apparatus 300 is incorporated as the address of a currently connected P2P-GO. The information processing apparatus 200 acquires the value of an associated BSSID subelement, and can thereby recognize that the second wireless communication unit 320 of the information processing apparatus 300 is connected to a GO (the first wireless communication unit 310 of the information processing apparatus 300).

Here, typically, in Wi-Fi CERTIFIED Miracast, a source apparatus is connected to the wireless communication unit (corresponding to the second wireless communication unit 320) of a sink apparatus using Wi-Fi Direct. Thereafter, the source apparatus starts a Wi-Fi CERTIFIED Miracast session with respect to the wireless communication unit (corresponding to the second wireless communication unit 320) of the sink apparatus.

However, in the embodiment of the present technology, a source apparatus initially performs a Wi-Fi Direct connection process with respect to an apparatus whose address is described in an associated BSS subelement. Specifically, the control unit 280 of the information processing apparatus 200 performs a Wi-Fi Direct connection process with respect to the first wireless communication unit 310 of the information processing apparatus 300 (620, 621). Thereafter, the information processing apparatus 200 operates as a P2P-client (622).

Next, the control unit 280 of the information processing apparatus 200 performs a TDLS connection process with respect to the second wireless communication unit 320 of the information processing apparatus 300 (623 to 625). Thereafter, the control unit 280 of the information processing apparatus 200 starts a Wi-Fi CERTIFIED Miracast connection process (647, 648).

Here, before and after the Wi-Fi CERTIFIED Miracast connection process, a source apparatus and a sink apparatus notifies the control apparatus 400 of constraint information (each apparatus's own performance information). Specifically, the notification is, for example, performed after the TDLS connection process (623 to 625).

Note that FIG. 8 to FIG. 10 show an example in which, before the Wi-Fi CERTIFIED Miracast connection process (647, 648), a source apparatus and a sink apparatus notify the control apparatus 400 of constraint information. Specifically, the control unit 280 of the information processing apparatus 200 transmits constraint information (information about the performance of the information processing apparatus 200) to the control apparatus 400 through the first wireless communication unit 310 of the information processing apparatus 300 (626 to 629). Also, the first wireless communication unit 310 of the information processing apparatus 300 transmits constraint information (information about the performance of the information processing apparatus 300) to the control apparatus 400 through the first wireless communication unit 310 of the information processing apparatus 300, under the control of the control unit 390 (630 to 633).

Also, after the completion of the Wi-Fi CERTIFIED Miracast connection process (647, 648), the source apparatus notifies the control apparatus 400 of information about a Wi-Fi CERTIFIED Miracast stream which is to be transmitted to the sink apparatus. This information about the stream (operation information) may be transmitted together with constraint information (each apparatus's own performance information), or may be transmitted at a timing different from that of constraint information.

Also, the control unit 440 of the control apparatus 400 records each item of information transmitted from each apparatus (a source apparatus and a sink apparatus) to the storage unit 450. For example, constraint information transmitted from each apparatus (a source apparatus and a sink apparatus) is recorded to the constraint information management table 460 shown in FIG. 5. Also, operation information (information about a stream) transmitted from each apparatus (a source apparatus and a sink apparatus) is recorded to the operation information management table 470 shown in FIG. 6.

Also, the control unit 440 of the control apparatus 400 records environment information acquired by itself or environment information transmitted from another apparatus (a source apparatus, a sink apparatus) to the storage unit 450. For example, the environment information is recorded to the environment information management table 480 shown in FIG. 7.

Thereafter, the control unit 440 of the control apparatus 400 generates control information for controlling each apparatus (a source apparatus, a sink apparatus), on the basis of environment information acquired by itself or each item of information (constraint information, operation information, environment information) transmitted from another apparatus (a source apparatus, a sink apparatus). For example, the control unit 440 of the control apparatus 400 determines a frequency band, a channel, a stream image format, a stream audio format, and a stream bit rate for use in transmission of a Wi-Fi CERTIFIED Miracast stream. Thereafter, the control unit 440 of the control apparatus 400 generates control information for causing each apparatus (a source apparatus, a sink apparatus) to execute control according to the determined parameters, and transmits the control information to each apparatus.

For example, the control unit 440 of the control apparatus 400 generates control information for causing a source apparatus to execute control according to the determined parameters (e.g., a frequency band, a channel, a stream image format, a stream audio format, a stream bit rate). Thereafter, the control unit 440 of the control apparatus 400 transmits the generated control information to the information processing apparatus 200 (source apparatus) (634 to 637).

Also, for example, the control unit 440 of the control apparatus 400 generates control information for causing a sink apparatus to execute control according to the determined parameters (e.g., a frequency band, a channel, a stream image format, a stream audio format). Thereafter, the control unit 440 of the control apparatus 400 transmits the generated control information to the information processing apparatus 300 (sink apparatus) (638 to 641). Note that each process (629, 633) is an example of an acquisition procedure as set forth in the appended claims. Also, each process (634, 638) is an example of a control procedure as set forth in the appended claims.

Also, a source apparatus performs control on the basis of control information transmitted from the control apparatus 400. For example, the information processing apparatus 200 changes the parameters determined by the control apparatus 400 on the basis of control information transmitted from the control apparatus 400 (649). For example, the information processing apparatus 200 changes frequency bands, channels, stream image formats, audio formats, or the like, and adjust the bit rate of a stream (649). Thereafter, after the changing, the information processing apparatus 200 starts transmission of a Wi-Fi CERTIFIED Miracast stream (650, 651).

Similarly, a sink apparatus performs control on the basis of control information transmitted from the control apparatus 400 at a predetermined timing.

Note that a source apparatus may first start these changes (e.g., a frequency band, a channel, a stream image format, a stream audio format, a stream bit rate), or a sink apparatus may do so first.

Here, a method for determining a frequency band or a channel will be described. For example, when a channel is determined, both a source apparatus and a sink apparatus can be used, and a method for selecting and determining a channel having least congestion can be used.

Also, when frequency bands or channels are changed, the channel switching mechanism specified in TDLS (646 (642 to 645)) may be used. Specifically, when frequency bands or channels for a stream are changed, the channel switch request frame and the channel switch response frame specified in the IEEE 802.11z specification can be used. For example, the channel switch request frame and the channel switch response frame are used to exchange information about changing of frequency bands or channels on the basis of control information, between the information processing apparatuses 200 and 300. As a result, frequency bands or channels for a stream can be changed.

Also, FIG. 8 to FIG. 10 show an example in which the control apparatus 400 transmits control information (634 to 641) before transmission of a Wi-Fi CERTIFIED Miracast stream (650, 651). Note that, after the start of transmission of a Wi-Fi CERTIFIED Miracast stream, the control apparatus 400 may transmit control information. In this case, a source apparatus and a sink apparatus dynamically change frequency bands, channels, stream image formats, stream audio formats, or the like while transmitting a stream. Also, the source apparatus dynamically changes bit rates or the like of a stream.

Here, it is assumed that the control apparatus 400 notifies a source apparatus and a sink apparatus of changing of stream image formats or stream audio formats (control information) before the start of connection of Wi-Fi CERTIFIED Miracast. In this case, the source apparatus and the sink apparatus can remove a portion of the capability negotiation process specified in the Wi-Fi Display standard. For example, in the capability negotiation process, the negotiation of an image format and the negotiation of an audio format can removed.

In the foregoing, an example has been described in which when the system includes only one source apparatus and only one sink apparatus, a Wi-Fi CERTIFIED Miracast stream is transmitted between the source apparatus and the sink apparatus. Note that it is also assumed that the system includes at least two source apparatuses or sink apparatuses, and a plurality of Wi-Fi CERTIFIED Miracast streams are transmitted. In this case, the control unit 440 of the control apparatus 400 can transmit control information to each apparatus (a source apparatus(es), a sink apparatus(es)) when necessary, to control each apparatus (a source apparatus(es), a sink apparatus(es)).

Here, it is also assumed that a plurality of Wi-Fi CERTIFIED Miracast streams are concurrently changed, or that the order of streams to be changed needs to be specified according to constraints on each apparatus. In this case, the control unit 440 of the control apparatus 400 incorporates time information into control information, and can thereby use the time information to control each apparatus (a source apparatus, a sink apparatus).

For example, the control unit 440 of the control apparatus 400 incorporates time information for specifying time at which changing is to be performed into control information, and transmits the control information to each apparatus (a source apparatus, a sink apparatus). Thereafter, each apparatus (a source apparatus, a sink apparatus) performs control on the basis of the received control information at a timing when time specified by the time information included in the received control information (specified time) arrives. For example, each apparatus (a source apparatus, a sink apparatus) changes a parameter (e.g., a frequency band, a channel, a stream image format, a stream audio format, a stream bit rate) determined by the control apparatus 400, on the basis of the received control information.

Thus, the control unit 440 of the control apparatus 400 can transmit, to each apparatus (a source apparatus, a sink apparatus), control information including time information for specifying time at which transmission and reception of a stream are to be controlled, for each apparatus. Also, an apparatus (a source apparatus, a sink apparatus) which has received the control information including the time information, controls transmission and reception of a stream on the basis of the received control information at a timing specified by the time information included in the received control information.

Also, after the start of transmission of a Wi-Fi CERTIFIED Miracast stream, each apparatus (a source apparatus, a sink apparatus) may regularly or irregularly transmit various items of information to the control apparatus 400. For example, each apparatus (a source apparatus, a sink apparatus) can regularly or irregularly transmit various items of information such as the status of transmission of a stream, the status of the wireless environment, and the like to the control apparatus 400.

Here, the status of transmission of a stream is, for example, the loss rate of RTP packets, the fluctuation in RTP packet arrival time, or the like. Also, the status of the wireless environment is, for example, the congestion level of each channel. Note that the status of the wireless environment can be transmitted only by each apparatus (a source apparatus, a sink apparatus) that has the function of measuring congestion. Also, these items of information are successively stored to the storage unit 450.

Also, the control unit 440 of the control apparatus 400 may generate control information on the basis of various items of information transmitted from each apparatus (a source apparatus, a sink apparatus), and transmit the control information to each apparatus (a source apparatus, a sink apparatus). For example, the control unit 440 of the control apparatus 400 can generate control information for changing, during transmission of a Wi-Fi CERTIFIED Miracast stream, the channel which is being used for the transmission, and transmit the control information to each apparatus (a source apparatus, a sink apparatus). Also, for example, the control unit 440 of the control apparatus 400 can generate control information for changing the bit rate of a Wi-Fi CERTIFIED Miracast stream, and transmit the control information to each apparatus (a source apparatus, a sink apparatus).

Note that the order of the processes shown in FIG. 8 to FIG. 10 is merely illustrative, and as described above, may be changed.

[Communication Examples when Transmission of Stream is Ended]

Figure 11:
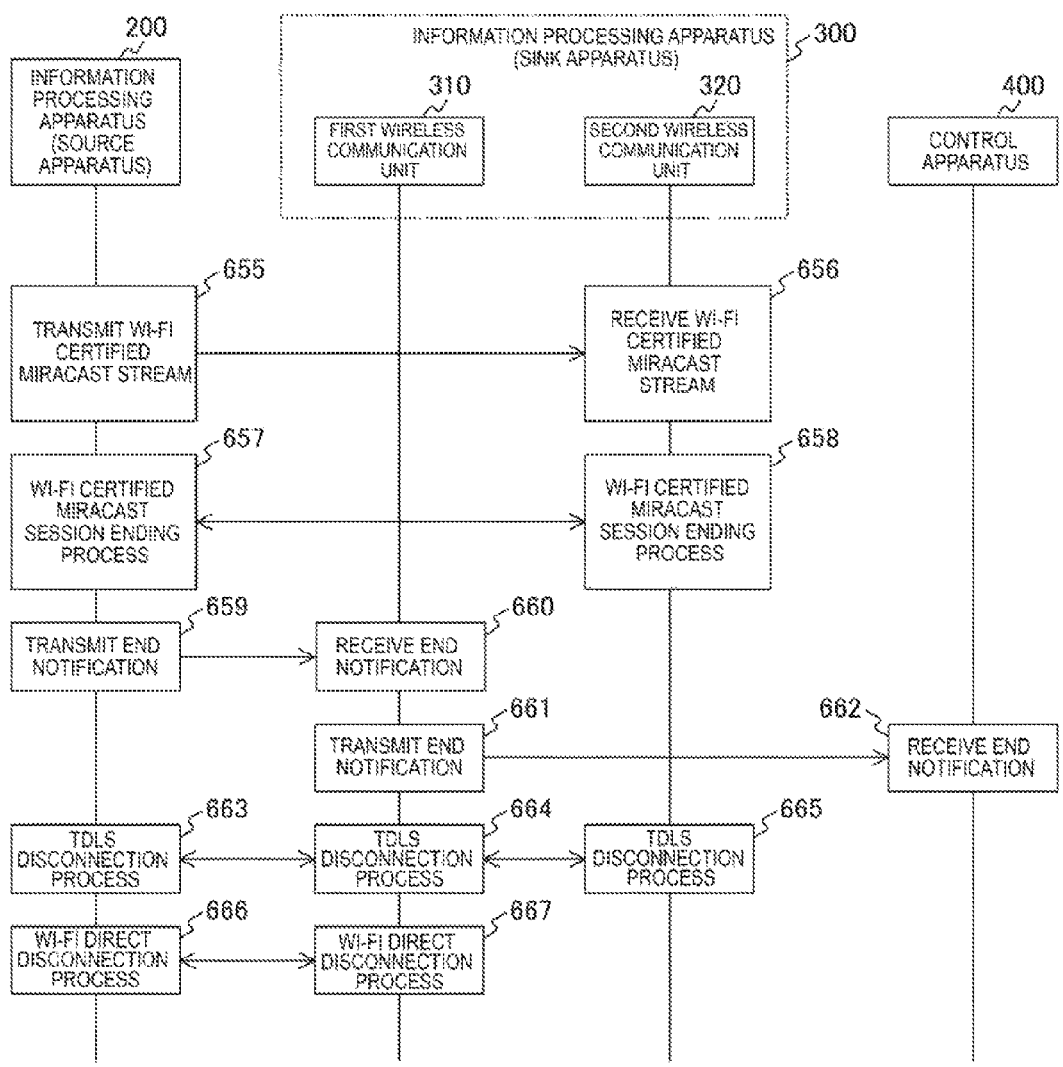
FIG. 11 is a sequence chart showing a communication process example between each apparatus included in a communication system 100 in an embodiment of the present technology.

FIG. 11 is a sequence chart showing a communication process example between each apparatus included in the communication system 100 in the embodiment of the present technology. Note that FIG. 11 shows a communication process example between the information processing apparatus (source apparatus) 200, the information processing apparatus (sink apparatus) 300, and the control apparatus 400.

Also, FIG. 11 shows a communication process example in which when a Wi-Fi CERTIFIED Miracast stream is being transmitted between the information processing apparatus 200 and the information processing apparatus 300, the stream transmission is ended.

As described above, a Wi-Fi CERTIFIED Miracast stream is being transmitted between the information processing apparatus 200 and the information processing apparatus 300 (the second wireless communication unit 320) (655, 656). In this case, an ending process for ending a Wi-Fi CERTIFIED Miracast session between the information processing apparatus 200 and the information processing apparatus 300 (the second wireless communication unit 320) is performed (657, 658).

Next, after ending the Wi-Fi CERTIFIED Miracast session, the control unit 280 of the information processing apparatus 200 notifies the control apparatus 400 of the end (659 to 662). For example, the control unit 280 of the information processing apparatus 200 transmits end notification indicating the end of the Wi-Fi CERTIFIED Miracast session, to the control apparatus 400 through the first wireless communication unit 310 of the information processing apparatus 300 (659 to 662).

Although, in FIG. 11, an example has been shown in which the information processing apparatus 200 transmits the end notification to the control apparatus 400, the information processing apparatus 300 may transmit the end notification to the control apparatus 400.

Next, a disconnection process for disconnecting TDLS is performed between the information processing apparatus 200 and the information processing apparatus 300 (the second wireless communication unit 320) (663 to 665). Also, when necessary, a disconnection process for disconnecting Wi-Fi Direct is performed between the information processing apparatus 200 and the information processing apparatus 300 (the first wireless communication unit 310) (666, 667).

Note that, as described above, it is assumed that the system includes at least two source apparatuses or sink apparatuses, and a plurality of Wi-Fi CERTIFIED Miracast streams are transmitted. In this case, the control unit 440 of the control apparatus 400 may transmit control information for changing frequency bands, channels, stream image formats or audio formats, stream bit rates, or the like which are to be used, to each apparatus, when necessary.

For example, it is assumed that an unoccupied channel occurs due to the end of a Wi-Fi CERTIFIED Miracast session. In this case, control can be performed so that another Wi-Fi CERTIFIED Miracast stream is moved to that channel, resulting in more stable transmission of a stream.

Thus, in the embodiment of the present technology, during a Wi-Fi CERTIFIED Miracast session, frequency bands, channels, image formats, audio formats, bit rates, and the like can be changed. Therefore, FIG. 12 to FIG. 15 show examples in changing of frequency bands, channels, image formats, audio formats, or bit rates is triggered. Note that the trigger examples shown in FIG. 12 to FIG. 15 are merely illustrative, and the embodiment of the present technology is not limited to these.

[Communication Examples when Resolution of Image Transmitted by Source Apparatus Changes]

Figure 12:
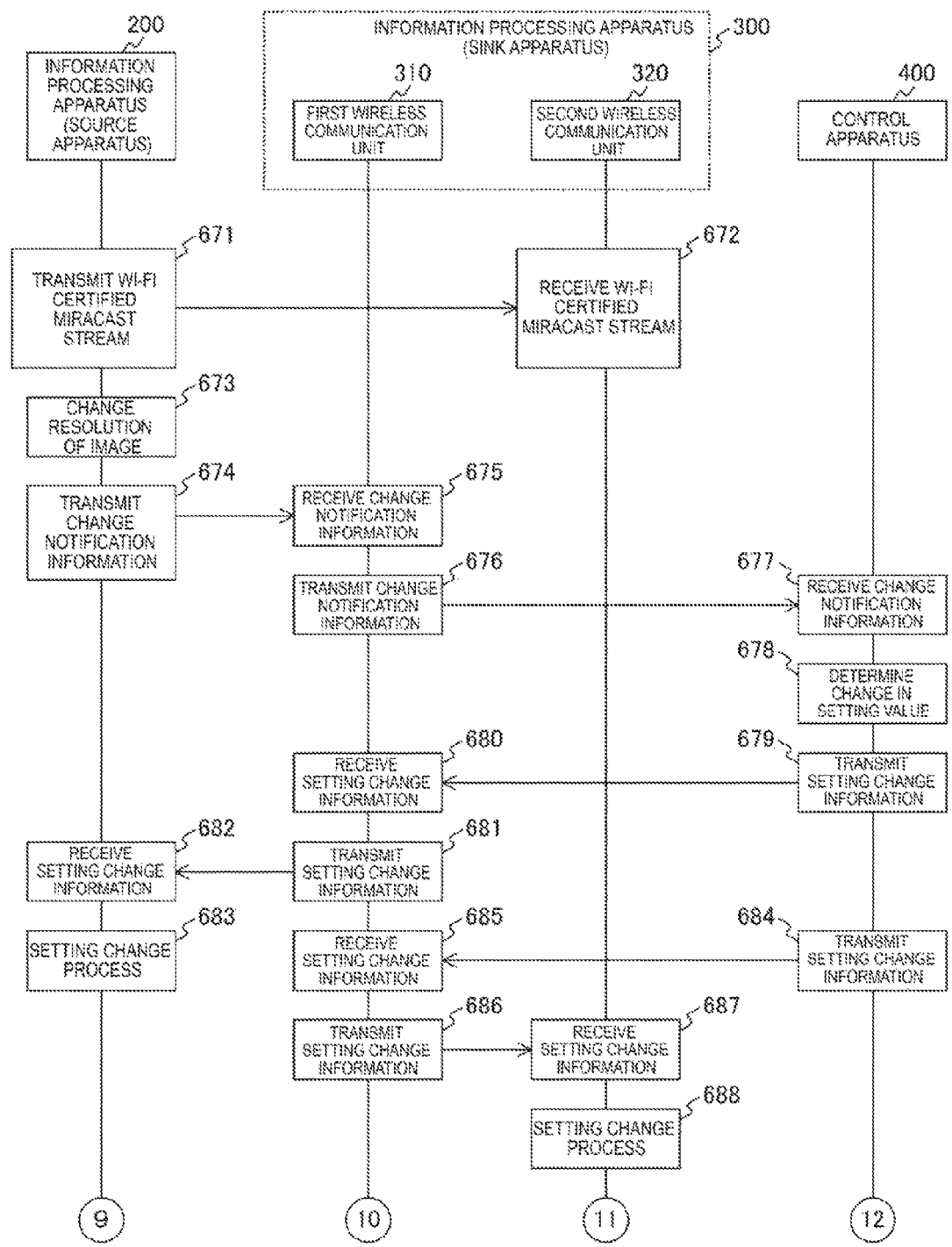
FIG. 12 is a sequence chart showing a communication process example between each apparatus included in a communication system 100 in an embodiment of the present technology.
Figure 13:
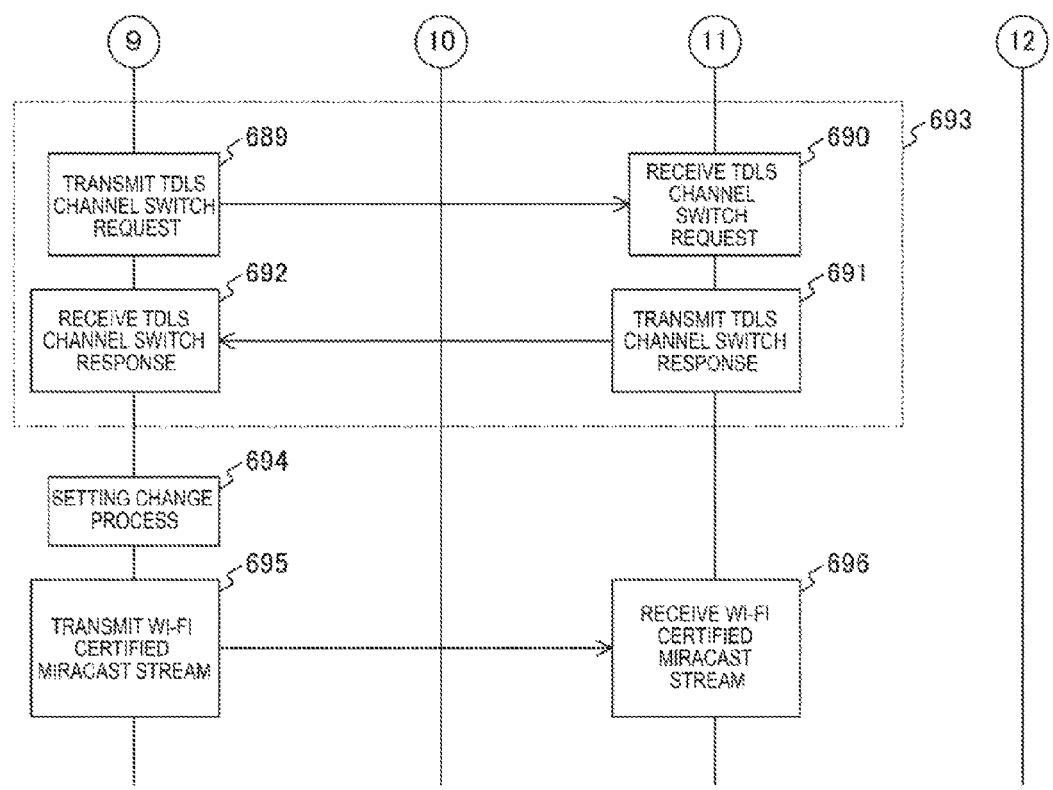
FIG. 13 is a sequence chart showing a communication process example between each apparatus included in a communication system 100 in an embodiment of the present technology.

FIG. 12 and FIG. 13 are sequence charts showing a communication process example between each apparatus included in the communication system 100 in the embodiment of the present technology. Note that FIG. 12 and FIG. 13 show a communication process example between the information processing apparatus (source apparatus) 200, the information processing apparatus (sink apparatus) 300, and the control apparatus 400.

Also, FIG. 12 and FIG. 13 show a communication process example in which, during transmission of a Wi-Fi CERTIFIED Miracast stream between the information processing apparatus 200 and the information processing apparatus 300, the resolution of an image to be transmitted changes.

As described above, a Wi-Fi CERTIFIED Miracast stream is being transmitted between the information processing apparatus 200 and the information processing apparatus 300 (the second wireless communication unit 320) (671, 672). In this case, it is assumed that it becomes necessary to change the resolution of an image to be transmitted (673). For example, it is assumed that, in the information processing apparatus 200, the user has performed an operation to change the resolution of an image to be transmitted.

When the resolution of an image to be transmitted has thus been changed (673), the control unit 280 of the information processing apparatus 200 transmits change notification information for notifying of the resolution of an image after the changing, to the control apparatus 400 through the first wireless communication unit 310 (674 to 677).

When receiving the change notification information (677), the control unit 440 of the control apparatus 400 determines whether or not the value of each setting for transmission of a Wi-Fi CERTIFIED Miracast stream needs to be changed (678). Here, the value of each setting is, for example, a frequency band, a channel, a stream image format, a stream audio format, a stream bit rate, or the like for transmission of a Wi-Fi CERTIFIED Miracast stream.

For example, the control unit 440 of the control apparatus 400 determines whether or not the value of each setting needs to be changed, on the basis of the change notification information, constraint information, operation information, environment information, or the like (678). Note that as constraint information, operation information, environment information, and the like, the contents of each management table (shown in FIG. 5 to FIG. 7) stored in the storage unit 450 can be used.

When it is determined that the value of each setting needs to be changed (678), the control unit 440 of the control apparatus 400 transmits setting change information for changing the setting value to the information processing apparatus 200 through the first wireless communication unit 310 (679 to 682). The setting change information is used to notify the information processing apparatus 200 of, for example, a frequency band, a channel, a stream image format, a stream audio format, or a stream bit rate after the changing. Thereafter, the control unit 280 of the information processing apparatus 200 performs a setting change process of changing the setting value for the information processing apparatus 200, on the basis of the setting change information (683).

Similarly, the control unit 440 of the control apparatus 400 transmits setting change information for changing the value of a setting to the information processing apparatus 300 through the first wireless communication unit 310 (684 to 687). The setting change information is used to notify the information processing apparatus 300 of, for example, a frequency band, a channel, a stream image format, a stream audio format, or a stream bit rate after the changing. Thereafter, the control unit 390 of the information processing apparatus 300 performs a setting change process of changing the setting value for the information processing apparatus 300, on the basis of the setting change information (688).

Also, the channel switching mechanism (693 (689 to 692)) specified in TDLS may be used to change frequency bands or channels (694). Thereafter, a Wi-Fi CERTIFIED Miracast stream is transmitted (695, 696)

Also, it is assumed that an image format or an audio format is changed concurrently with a frequency band or a channel. For example, when a source apparatus increases the resolution of an image from full high definition (HD) to 4K, it is preferable to change the band of a wireless channel to a wider band, and change the efficiency of compression codec of an image to a higher efficiency. Also, when the resolution of an image to be transmitted is decreased, a wireless channel which has some congestion may be used, and the compression codec of an image can be changed to one having a lower efficiency. In this case, a change can be made so that a higher-efficiency compression codec is used for another image stream which has a higher priority.

[Communication Examples in which Display Region of Sink Apparatus Changes]

Figure 14:
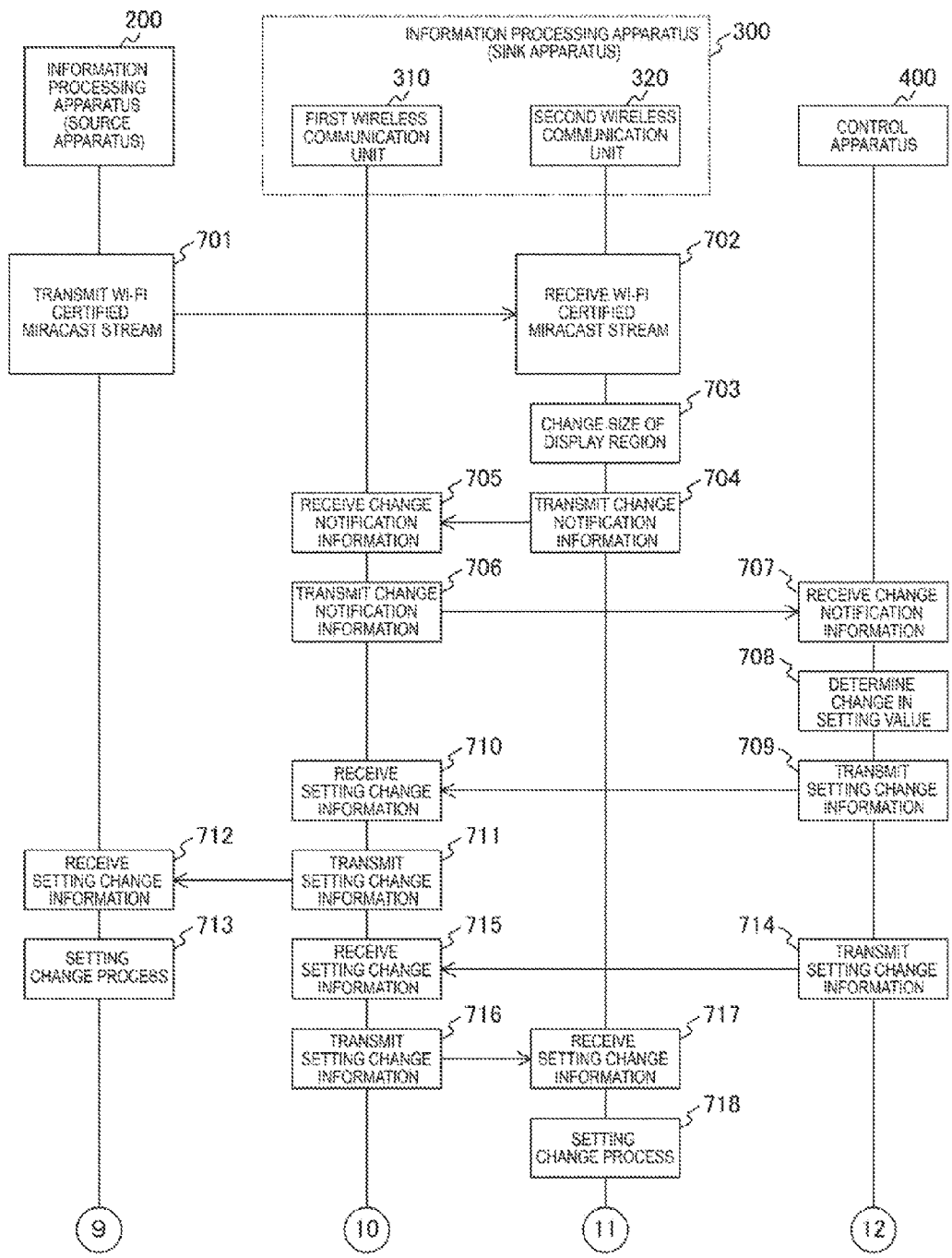
FIG. 14 is a sequence chart showing a communication process example between each apparatus included in a communication system 100 in an embodiment of the present technology.

FIG. 14 is a sequence chart showing a communication process example between each apparatus included in the communication system 100 in the embodiment of the present technology. Note that FIG. 14 shows a communication process example between the information processing apparatus (source apparatus) 200, the information processing apparatus (sink apparatus) 300, and the control apparatus 400.

Also, FIG. 14 shows a communication process example when the size of a display region of a sink apparatus changes during transmission of a Wi-Fi CERTIFIED Miracast stream between the information processing apparatus 200 and the information processing apparatus 300.

For example, it is assumed that a sink apparatus equipped with a large-size display as a display apparatus displays an image (Wi-Fi CERTIFIED Miracast image) transmitted from a source apparatus on a portion of the large-size display. For example, it is assumed that when the display region of an image transmitted from a source apparatus is reduced, then even if the resolution or bit rate of a Wi-Fi CERTIFIED Miracast stream is reduced, it is often that a deterioration in display quality is not recognized by the user. Therefore, for example, when the display region of an image transmitted from a source apparatus is reduced, the wireless band can be saved by reducing the resolution or bit rate of the image.

As described above, a Wi-Fi CERTIFIED Miracast stream is being transmitted between the information processing apparatus 200 and the information processing apparatus 300 (the second wireless communication unit 320) (701, 702). In this case, it is assumed that, in a sink apparatus, the size of a display region has changed (703). For example, it is assumed that, in the information processing apparatus 300, the user's operation has been performed to change the display region of an image transmitted from the information processing apparatus 200.

Thus, when the display region of an image has been changed (703), the control unit 390 of the information processing apparatus 300 transmits change notification information for notifying of the resolution of the display region after the changing, to the control apparatus 400 through the first wireless communication unit 310 (704 to 707).

When receiving the change notification information (707), the control unit 440 of the control apparatus 400 determines whether or not the value of each setting for transmission of a Wi-Fi CERTIFIED Miracast stream needs to be changed (708). Here, the value of each setting is, for example, a frequency band, a channel, a stream image format, a stream audio format, a stream bit rate, or the like which is used for transmission of a Wi-Fi CERTIFIED Miracast stream.

For example, the control unit 440 of the control apparatus 400 determines whether or not the value of each setting needs to be changed, on the basis of the change notification information, constraint information, operation information, environment information, or the like (708). Note that, as constraint information, operation information, environment information, and the like, the contents of each management table (shown in FIG. 5 to FIG. 7) stored in the storage unit 450 can be used.

For example, when a Wi-Fi CERTIFIED Miracast stream ise being transmitted, then if the bit rate of this stream is reduced, more bands can be allocated to other streams. Therefore, when a plurality of Wi-Fi CERTIFIED Miracast streams are being transmitted, then if the resolution of a display region is changed and reduced, it is determined that the bit rate of a stream in the display region needs to be changed and reduced.

When it is determined that the value of each setting needs to be changed (708), the control unit 440 of the control apparatus 400 transmits setting change information for changing the setting value to the information processing apparatus 200 through the first wireless communication unit 310 (709 to 712). As the setting change information, the information processing apparatus 200 is notified of, for example, a frequency band, a channel, a stream image format, a stream audio format, or a stream bit rate after the changing. Thereafter, the control unit 280 of the information processing apparatus 200 performs a setting change process of changing the setting value for the information processing apparatus 200, on the basis of the setting change information (713).

Similarly, the control unit 440 of the control apparatus 400 transmits setting change information for changing the value of a setting to the information processing apparatus 300 through the first wireless communication unit 310 (714 to 717). As the setting change information, the information processing apparatus 300 is notified of, for example, a frequency band, a channel, a stream image format, a stream audio format, or a stream bit rate after the changing. Thereafter, the control unit 390 of the information processing apparatus 300 performs a setting change process of changing the setting value for the information processing apparatus 300, on the basis of the setting change information (718).

Note that the other processes are similar to those of FIG. 13 and will not be described here.

[Communication Examples when Wireless Status of Channel Being Used Deteriorates]

Figure 15:
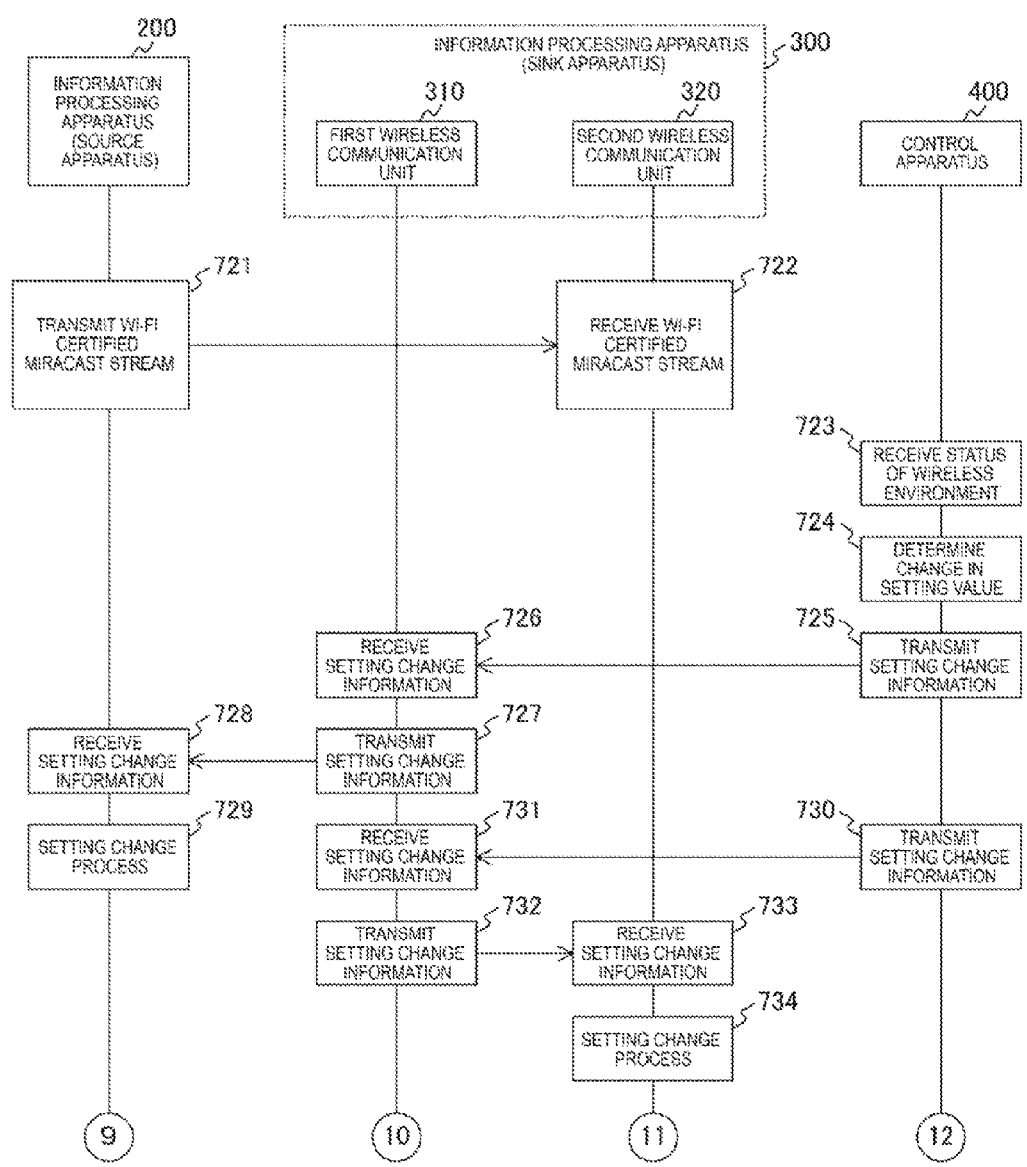
FIG. 15 is a sequence chart showing a communication process example between each apparatus included in a communication system 100 in an embodiment of the present technology.

FIG. 15 is a sequence chart showing a communication process example between each apparatus included in the communication system 100 in the embodiment of the present technology. Note that FIG. 15 shows a communication process example between the information processing apparatus (source apparatus) 200, the information processing apparatus (sink apparatus) 300, and the control apparatus 400.

Also, FIG. 15 shows a communication process example in which the wireless status of a channel being used for transmission of a Wi-Fi CERTIFIED Miracast stream deteriorates.

For example, it is assumed that another apparatus (IEEE 802.11 apparatus) starts communication on the same channel that is being used for transmission of a Wi-Fi CERTIFIED Miracast stream. In this case, it is assumed that the band of that channel which can be used for transmission of a Wi-Fi CERTIFIED Miracast stream is reduced. In such a case, when another channel is not occupied, then if the channel for transmission of a Wi-Fi CERTIFIED Miracast stream is changed to the unoccupied channel, stable communication can be continued.

As described above, the control unit 440 of the control apparatus 400 regularly or irregularly measures and acquires the status of the wireless environment (723). The information thus acquired is successively recorded to the storage unit 450. Thereafter, the control unit 440 of the control apparatus 400 determines whether or not the value of each setting for transmission of a Wi-Fi CERTIFIED Miracast stream needs to be changed (724). Here, the value of each setting is, for example, a frequency band, a channel, a stream image format, a stream audio format, a stream bit rate, or the like for transmission of a Wi-Fi CERTIFIED Miracast stream.

When it is determined that the value of each setting needs to be changed (724), the control unit 440 of the control apparatus 400 transmits setting change information for changing the setting value to the information processing apparatus 200 through the first wireless communication unit 310 (725 to 728). As the setting change information, the information processing apparatus 200 is notified of, for example, a frequency band, a channel, a stream image format, a stream audio format, a stream bit rate, or the like after the changing. Thereafter, the control unit 280 of the information processing apparatus 200 performs a setting change process of changing the setting value for the information processing apparatus 200, on the basis of the setting change information (729).

Similarly, the control unit 440 of the control apparatus 400 transmits the setting change information for changing the value of a setting to the information processing apparatus 300 through the first wireless communication unit 310 (730 to 733). As the setting change information, the information processing apparatus 300 is notified of, for example, a frequency band, a channel, a stream image format, a stream audio format, or a stream bit rate after the changing. Thereafter, the control unit 390 of the information processing apparatus 300 performs a setting change process of changing the setting value for the information processing apparatus 300, on the basis of the setting change information (734).

Note that the other processes are similar to those of FIG. 13 and will not be described here.

Although, in FIG. 15, an example has been shown in which the control apparatus 400 measures and acquires the status of the wireless environment, another apparatus (a source apparatus, a sink apparatus) may measure the status of the wireless environment. In this case, another apparatus (a source apparatus, a sink apparatus) which has measured the status of the wireless environment regularly or irregularly notifies the control apparatus 400 of the status of the wireless environment.

[Operation Examples of Control Apparatus]

Figure 16:
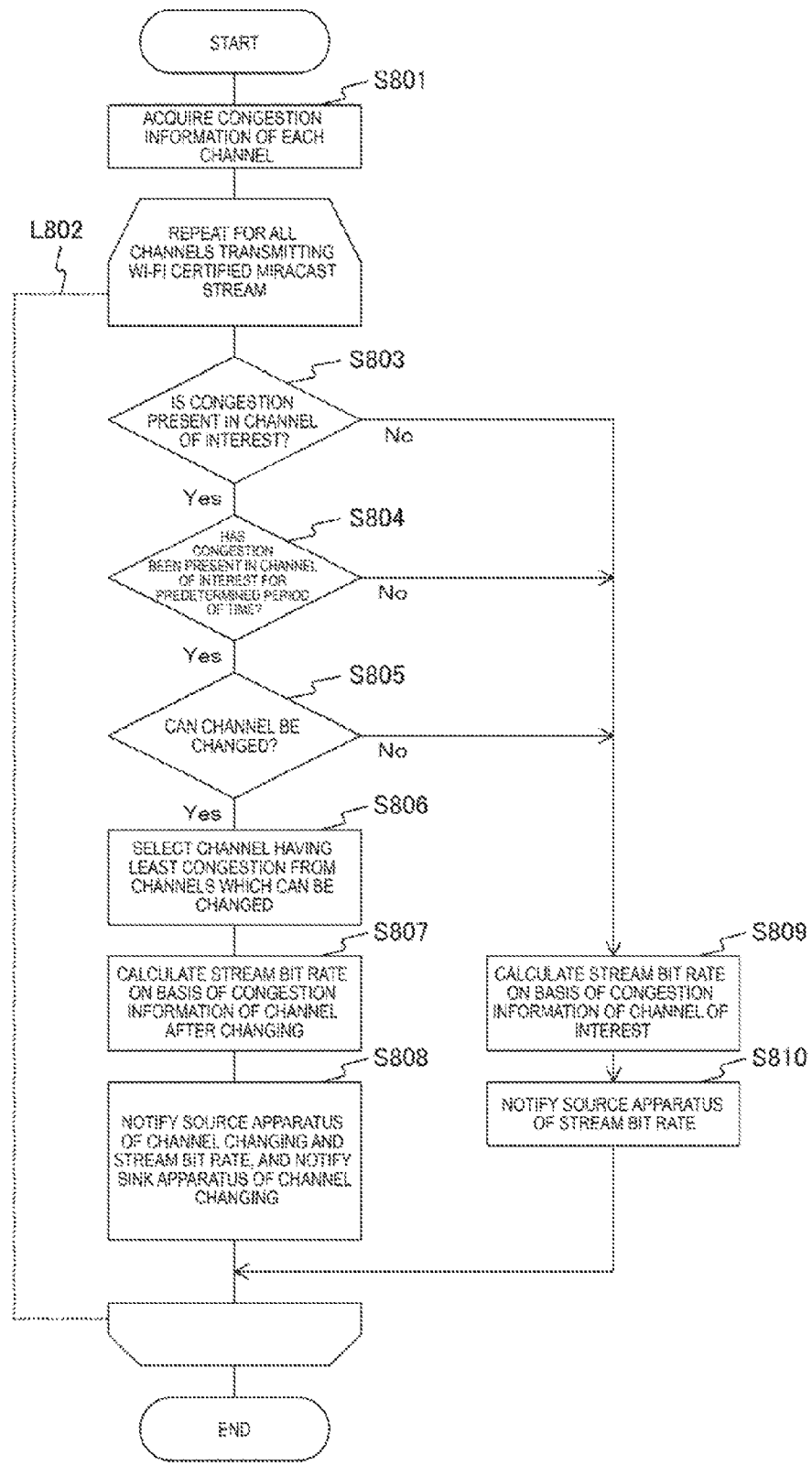
FIG. 16 is a flowchart showing an example of a process procedure of a communication control process performed by a control apparatus 400 in an embodiment of the present technology.

FIG. 16 is a flowchart showing an example of a process procedure of a communication control process performed by the control apparatus 400 in the embodiment of the present technology. FIG. 16 shows an example in which the status of the wireless environment or the like is regularly or irregularly checked to determine whether or not a frequency band, a channel, a stream bit rate, or the like for transmission of a Wi-Fi CERTIFIED Miracast stream needs to be changed. Also, it is assumed that the control apparatus 400 regularly or irregularly performs the communication control process of FIG. 16.

The control unit 440 acquires congestion information (e.g., the level of wireless congestion of each channel) generated by the congestion level determination unit 420 (step S801). Note that the control unit 440 may acquire the congestion level information from another apparatus (a source apparatus, a sink apparatus).

Next, the following process is repeatedly performed for all channels in which a Wi-Fi CERTIFIED Miracast stream is being transmitted (loop L802).

A channel of interest in which a Wi-Fi CERTIFIED Miracast stream is being transmitted is to be checked by the control unit 440. The control unit 440 determines whether or not congestion is present in the channel of interest (step S803). For example, a previously set threshold can be used to determine whether or not congestion is present in the channel of interest. For example, it can be determined whether or not congestion is present in the channel of interest, on the basis of the result of comparison of a value (e.g., a congestion level) specified by the acquired congestion information with the threshold. For example, when the value (e.g., a congestion level) specified by the acquired congestion information is greater than the threshold as a reference, it can be determined that congestion is present in the channel of interest.

When congestion is not present in the channel of interest (step S803), the control unit 440 calculates the stream bit rate on the basis of the congestion information about the channel of interest (e.g., the status of wireless congestion of the channel of interest) (step S809). For example, it is assumed that if congestion was present in a channel of interest in the past, the stream bit rate has been reduced. In such a case, if the current congestion of the channel of interest is reduced, the bit rate is calculated so that the bit rate (low bit rate) which has been calculated during the past congestion is increased.

Next, the control unit 440 notifies a source apparatus of the calculated stream bit rate (step S810). As a result, for example, for a source apparatus for which congestion was present in a channel of interest in the past, and the stream bit rate has been reduced, if the current congestion of the channel of interest is reduced, the bit rate can be set high.

Also, when congestion is present in the channel of interest (step S803), the control unit 440 acquires the past congestion information (e.g., the status of wireless congestion of the channel of interest), and determines whether or not congestion has continued for a predetermined period of time in the channel of interest (step S804). Specifically, it is determined whether the congestion in the channel of interest has continued for a predetermined period of time or is temporary (step S804). For example, the congestion level in the environment information management table 480 shown in FIG. 7 is used.

When congestion has not continued for the predetermined period of time in the channel of interest (i.e., the congestion is temporary) (step S804), control proceeds to step S809. In this case, the control unit 440 recalculates the stream bit rate (step S809), and notifies a source apparatus of the result of the calculation (step S810). For example, on the basis of the recalculation, the bit rate is set lower than before. Thereafter, a source apparatus is notified of the low bit rate, and therefore, data loss due to the shortage of the band can be prevented.

When congestion has continued for the predetermined period of time in the channel of interest (i.e., the congestion is not temporary) (step S804), the control unit 440 determines whether or not the channel can be changed (step S805). For example, the control unit 440 can determine whether or not there is another channel to which transmission can be moved, using constraint information (information stored in the constraint information management table 460 shown in FIG. 5) of which a source apparatus and a sink apparatus have previously notified the control apparatus 400.

For example, it is assumed that, for some apparatuses (or some situations), the channel currently used cannot be changed, or there is no other channel that can be shared by a source apparatus and a sink apparatus.

When the channel cannot be changed (step S805), the control unit 440 does not change the channel, recalculates a new bit rate (step S809), and notifies a source apparatus of the result of the calculation (step S810).

Also, when the channel can be changed (step S805), the control unit 440 selects a channel which has least congestion from available channels (step S806). Next, the control unit 440 acquires congestion information about the selected channel (e.g., the status of wireless congestion of the selected channel), and based on the congestion information, recalculates the stream bit rate (step S807).

Next, the control unit 440 notifies both a source apparatus and a sink apparatus of the selected channel, and notifies the source apparatus of the stream bit rate (step S808). Thus, the source apparatus and the sink apparatus are notified of the selected channel, and therefore, can change the channel on the basis of the notification. Also, the source apparatus is notified of the stream bit rate, and therefore, can set the stream bit rate on the basis of the notification. As a result, more stable image transmission and audio transmission can be achieved.

Here, it is assumed that when the channel can be changed (step S805), a channel having least congestion of available channels is the channel of interest. In this case, the control unit 440 selects the channel of interest (step S806), and recalculates the stream bit rate on the basis of congestion information about the channel of interest (e.g., the status of wireless congestion of the selected channel) (step S807). In this case, the control unit 440 does not notify a source apparatus and a sink apparatus of the channel of interest, and can notify a source apparatus of only the stream bit rate (step S808). Note that step S801 is an example of an acquisition procedure as set forth in the appended claims. Also, the loop L802 is an example of a control procedure as set forth in the appended claims.

Note that it is assumed that, as shown in FIG. 1, in an environment where there are a plurality of source apparatuses and a plurality of sink apparatuses, when a channel for a certain stream has been changed, a change may need to be made for another stream. In this case, the control unit 440 of the control apparatus 400 can notify all apparatus involved of channel changing in step S808.

Thus, wireless channels or stream bit rates for transmission of a Wi-Fi CERTIFIED Miracast stream can be dynamically changed, depending on the status of wireless congestion.

Although FIG. 16 shows an example in which channels are changed, which is triggered by deterioration of congestion in a wireless channel, other factors may become a trigger. For example, changing of channels can be triggered by the following (D1) to (D3):

(D1) transmission is moved to another channel at a timing when it has been detected that congestion did not occur for a long period of time;

(D2) congestion occurred in the current channel, so that transmission was temporarily moved to another channel, and thereafter, congestion was removed in the original channel, so that transmission is moved back to the current channel; and (D3) when the bit rate of a stream transmitted by a source apparatus has increased significantly (e.g., the resolution of an image being transmitted has increased), a channel which can provide a wider band is searched for and transmission is moved to that channel.

Here, it is assumed that a P2P environment in which there are a plurality of source apparatuses and a plurality of sink apparatuses is constructed using the Wi-Fi CERTIFIED Miracast technique. For example, it is assumed that one source apparatus transmits a stream to a plurality of sink apparatuses, or that a plurality of source apparatuses transmit a stream to one sink apparatus. In this case, for example, it is assumed that, after the start of transmission of a Wi-Fi CERTIFIED Miracast stream, a wireless channel or frequency being used needs to be changed during the transmission. For example, it is assumed that when a new apparatus starts operation, congestion occurs in a wireless channel being used. In this case, it is assumed that transmission is moved to a channel having less congestion. Also, it is assumed that when it has become necessary to change to transmission of an image having a high resolution, transmission is moved to a frequency band which can provide a wider band (e.g., 60 GHz).

Here, in Wi-Fi CERTIFIED Miracast, Wi-Fi Direct and TDLS are specified as Layer 2 techniques. For example, it is assumed that Wi-Fi Direct is used as Layer 2. In this case, a GO can change operating channels which are to be used, using the extended channel switch announcement function specified in IEEE 802.11y.

However, as a result of such changing, wireless channels in all Wi-Fi CERTIFIED Miracast sessions mediated by the GO are changed. Therefore, the extended channel switch announcement function cannot be applied to changing of channels or changing of frequencies for only a specific Wi-Fi CERTIFIED Miracast session(s).

Also, it is assumed that, as a connection technique for Layer 2, TDLS (IEEE 802.11z) is used. In this case, a mechanism called channel switching can be used to change wireless channels for each Wi-Fi CERTIFIED Miracast session. Note that, in this case, each apparatus needs to support the channel switching mechanism. Also, in order to implement TDLS, it is necessary to prepare an AP and connect all apparatuses (a source apparatus and a sink apparatus) to the AP. Therefore, even when a P2P environment is constructed, it is necessary to provide an AP.

Also, the Wi-Fi CERTIFIED Miracast specification does not specify the band control, and the stream bit rate control depends on the implementation of a source apparatus. However, when a plurality of source apparatuses and a plurality of sink apparatuses concurrently use Wi-Fi CERTIFIED Miracast, the same wireless resources are shared by a plurality of apparatuses. Therefore, the total of bands used in each Wi-Fi CERTIFIED Miracast session may exceed wireless resources, or streams may be concentrated to a specific channel.

In such environments, it is preferable to monitor the entire wireless environment, and assign each Wi-Fi CERTIFIED Miracast session to an appropriate channel. Similarly, it is preferable to distribute bands for each Wi-Fi CERTIFIED Miracast session according to the priority of the session. As a result, the missing and disturbance of an image and audio due to the shortage of bands or wireless congestion can be avoided, and more bands can be allocated to an image and audio having higher priority, leading to an improvement in the user's experience.

Also, each apparatus (a source apparatus and a sink apparatus) can recognize the values of settings for a stream (e.g., a wireless channel, an image format, an audio format) which optimize wireless resources in the entire system. For example, it is assumed that information about the performance of an apparatus on the opposite end of connection is acquired, and the values of settings (e.g., a wireless channel, an image format, an audio format) are determined. In this case, for example, it is likely that a wireless channel having a wide band is used for transmission of an image having a low resolution (e.g., an image which does not require a very wide band).

Also, it is assumed that the wireless channel, image format, audio format, or the like of a certain stream is dynamically changed. For some apparatuses, there is a constraint on the numbers of wireless channels, image encoders/decoders, and audio encoders/decoders which can be used concurrently, and therefore, if one stream is changed, other streams are likely to be affected. However, each apparatus (a source apparatus and a sink apparatus) can recognize only information about an apparatus which is directly connected to that apparatus.

Therefore, in the embodiment of the present technology, the control apparatus 400 receives constraint conditions (e.g., constraint conditions for a channel, the number of available encoders/decoders) for each apparatus (a source apparatus and a sink apparatus) from each apparatus (a source apparatus and a sink apparatus) and manages the constraint conditions. As a result, the control apparatus 400 can recognize constraint conditions for all apparatuses, and which apparatus has a Wi-Fi CERTIFIED Miracast connection with which apparatus, in a centralized manner.

Also, the control apparatus 400 specifies, to each apparatus (a source apparatus and a sink apparatus), the values of settings (e.g., a wireless channel, an image format, an audio format) which optimize wireless resources in the entire system. Also, each apparatus (a source apparatus and a sink apparatus) performs setting on the basis of the setting values (e.g., a wireless channel, an image format, an audio format) according to the specification. As a result, optimum setting values (e.g., a wireless channel, an image format, an audio format) can be selected for the entire system.

Also, it is assumed that, in an environment in which there are a plurality of source apparatuses and a plurality of sink apparatuses, wireless channels, image formats, and audio formats of a stream are dynamically changed. In this case, other streams are likely to be affected. For example, each apparatus (a source apparatus and a sink apparatus) can recognize only information about an apparatus(es) which is not directly connected to that apparatus, and therefore, cannot recognize the range of the influence.

Therefore, in the embodiment of the present technology, when each apparatus (a source apparatus and a sink apparatus) dynamically changes a stream, the control apparatus 400 notifies each apparatus of a new setting value, taking into account constraint conditions for each apparatus (a source apparatus and a sink apparatus). For example, it is assumed that when the channel, image format, or audio format of one stream is changed, it is necessary to change the setting for another stream. In this case, the control apparatus 400 notifies each apparatus (a source apparatus, a sink apparatus) involved with the changing of the setting value, and therefore, a constraint can be satisfied in the entire system.

Also, in the embodiment of the present technology, a wireless LAN device serving as a P2P-GO and a wireless LAN device serving as a P2P-client are provided in at least one of apparatuses (a source apparatus and a sink apparatus). In this case, for example, each apparatus (a source apparatus and a sink apparatus) initially establishes Wi-Fi Direct connection with the P2P-GO. After the connection, each apparatus connects to another apparatus for which a Wi-Fi CERTIFIED Miracast session is to be started, using TDLS.

As a result, wireless channels can be dynamically changed for each Wi-Fi CERTIFIED Miracast stream within the range of the Wi-Fi CERTIFIED Miracast standard and without providing an AP.

Also, when each apparatus (a source apparatus and a sink apparatus) connects to a GO, the provisioning function specified in Wi-Fi Direct can be used. Therefore, compared with the case where Wi-Fi CERTIFIED Miracast is performed through an AP, various user operations can be removed. As a result, convenience can be improved. Note that the various user operations include, for example, the operation of inputting a service set identifier (SSID) and a pass phrase, and the operation of pressing a Wi-Fi protected setup (WPS) button.

Thus, in the embodiment of the present technology, an appropriate environment can be constructed using the Wi-Fi Direct, TDLS (IEEE 802.11z), and Wi-Fi CERTIFIED Miracast mechanisms. Specifically, in an environment in which there are a plurality of source apparatuses and a plurality of sink apparatuses, an appropriate Wi-Fi CERTIFIED Miracast environment can be constructed. Also, channels, frequency bands, and the like can be appropriately changed (band control) for each Wi-Fi CERTIFIED Miracast session.

Also, for example, unlike the case where a system is constructed using only TDLS, it is not necessary to provide an AP. Therefore, the cost of providing an AP can be removed. Also, in an area where an AP is not provided (e.g., an outdoor area), an appropriate Wi-Fi CERTIFIED Miracast environment can be constructed in an environment in which there are a plurality of source apparatuses and a plurality of sink apparatuses.

Also, when an AP is used, it is necessary to perform user operations (e.g., the operation of inputting an SSID and a pass phrase, the operation of pressing the WPS button) during connection to the AP, and therefore, the user operations require time and effort. In contrast to this, in the embodiment of the present technology, the first wireless communication unit 310 operating as a P2P-GO is provided. As a result, unlike the case where an AP is provided, WPS can be automatically started using the provisioning function when another apparatus connects to the first wireless communication unit 310.

Also, by providing an apparatus having the band control function (the control apparatus 400), the overall wireless status, the overall wireless congestion level, and the like can be recognized, and appropriate bit rates can be distributed to Wi-Fi CERTIFIED Miracast streams. As a result, for example, image disturbance due to band shortage can be avoided, and a high bit rate can be assigned to a stream having a high priority. Also, an increase in loss or transmission delay of stream data due to wireless congestion can be prevented.

<2. Application Examples>

The technology according to the present disclosure can be applied to various products. For example, the information processing apparatuses 101, 102, 200 and 300 and the control apparatus 400 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation apparatuses. Further, the information processing apparatuses 101, 102, 200 and 300 and the control apparatus 400 may be realized as terminals (also referred to as machine type communication (MTC) terminals) which perform machine to machine (M2M) communication, such as smart meters, vending machine, remote monitoring apparatuses and point of sale (POS) terminals. Furthermore, the information processing apparatuses 101, 102, 200 and 300 and the control apparatus 400 may be wireless communication modules mounted in such terminals (e.g., integrated circuit modules configured in one die).

[2.1. First Application Example]

Figure 17:
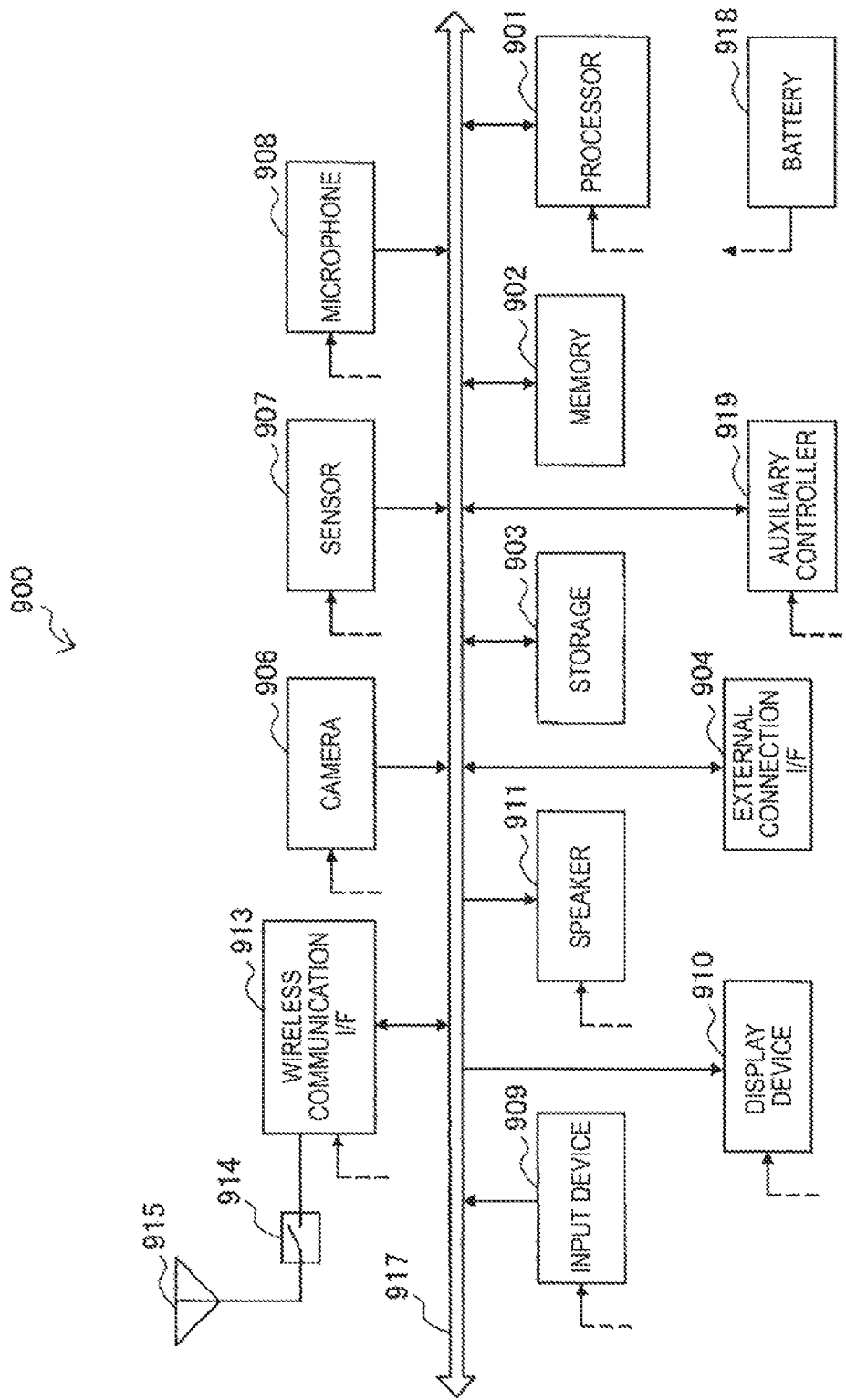
FIG. 17 is a block diagram showing an example of a schematic configuration of a smartphone.

FIG. 17 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores programs executed by the processor 901 and data. The storage 903 can include a storage medium such as a semiconductor memory or a hard disk. The externally connected interface 904 is an interface for connecting an externally attached device such as a memory card or a universal serial bus (USB) device to the smartphone 900.

The camera 906 has an image sensor, for example, a charge coupled device (CCD) or a complementary metal oxide semiconductor (CMOS) to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad to execute the wireless LAN communication. The wireless communication interface 913 can communicate with another apparatus via a wireless LAN access point in an infrastructure mode. In addition, the wireless communication interface 913 can directly communicate with another apparatus in a direct communication mode such as an ad hoc mode, Wi-Fi Direct, or the like. Wi-Fi Direct is different from the ad hoc mode, and thus one of two terminals operates as an access point. However, communication is performed directly between the terminals. The wireless communication interface 913 can typically include a baseband processor, a radio frequency (RF) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (e.g., circuits for different wireless communication schemes) included in the wireless communication interface 913. The antenna 915 has a single or a plurality of antenna elements (e.g., a plurality of antenna elements constituting a MIMO antenna), and is used for transmission and reception of wireless signals from the wireless communication interface 913. Also, the wireless communication interface 913 may have a wireless communication interface function for connecting to a public line compliant with IEEE 802.16, a 3GPP specification (e.g., W-CDMA, GSM, WiMAX, WiMAX2, LTE, LTE-A), or the like, and communicate with the public line.

Note that the smartphone 900 may include a plurality of antennas (e.g., antennas for a wireless LAN, antennas for a proximity wireless communication scheme, or antennas for public network, or the like), without being limited to the example of FIG. 17. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 17 via power supply lines partially indicated by dashed lines in the drawing. The auxiliary controller 919 causes, for example, required minimum functions of the smartphone 900 to be operated in a sleep mode.

In the smartphone 900 shown in FIG. 17, the control unit 280 described with reference to FIG. 2, the control unit 390 described with reference to FIG. 3, and the control unit 440 described with reference to FIG. 4, may be implemented in the wireless communication interface 913. Also, a portion of these functions may be implemented in the processor 901 or the auxiliary controller 919.

Note that the smartphone 900 may operate as a wireless access point (software AP) by the processor 901 executing the access point function at the application level. Also, the wireless communication interface 913 may have the wireless access point function.

[2-2. Second Application Example]

Figure 18:
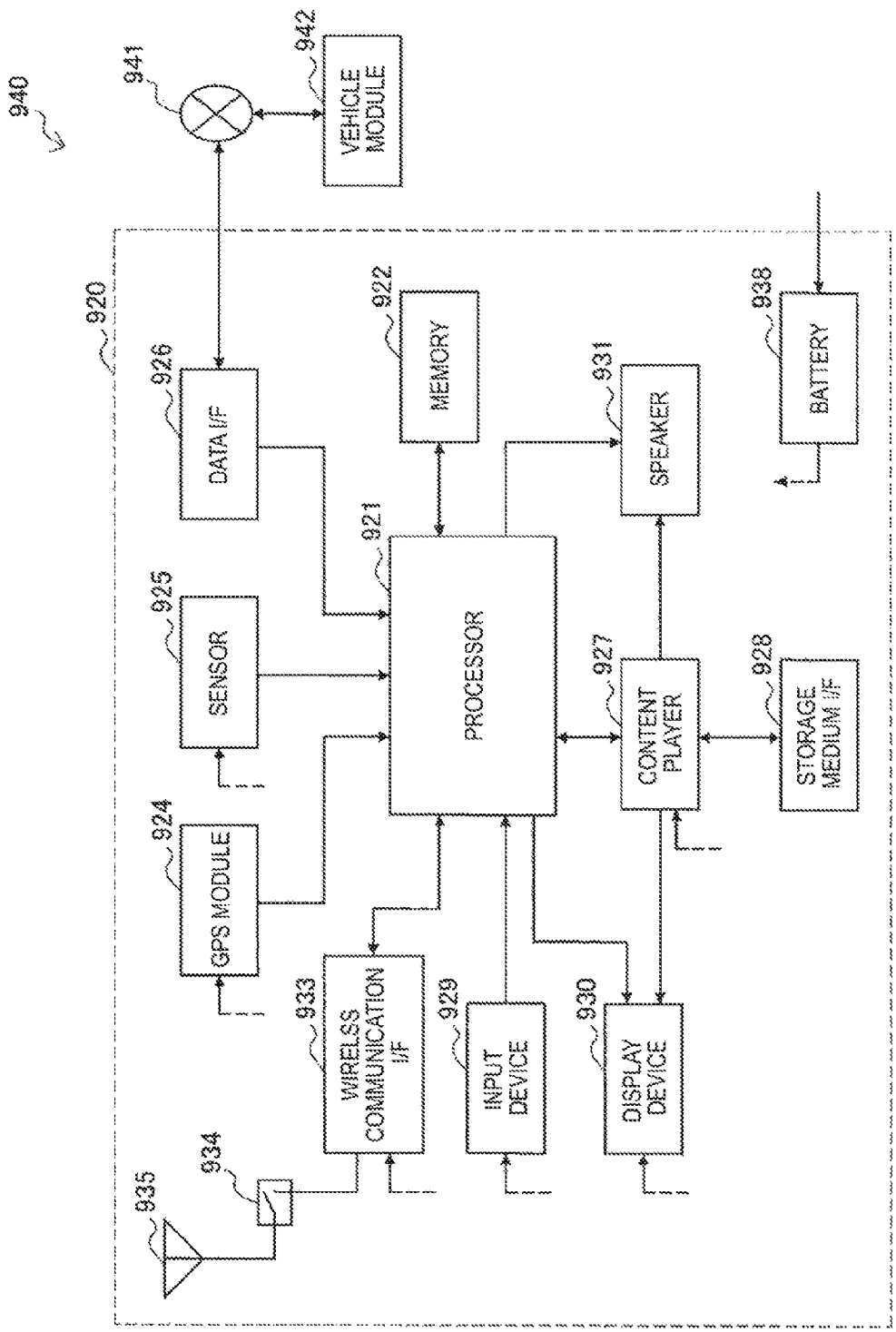
FIG. 18 is a block diagram showing an example of a schematic configuration of a car navigation apparatus.

FIG. 18 is a block diagram showing an example of a schematic configuration of a car navigation apparatus 920 to which the technology of the present disclosure can be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation apparatus 920. The memory 922 includes a RAM and a ROM storing programs executed by the processor 921 and data.

The GPS module 924 measures a position of the car navigation apparatus 920 (e.g., latitude, longitude, and altitude) using GPS signals received from a GPS satellite. The sensor 925 can include a sensor group including, for example, a gyro sensor, a geomagnetic sensor, a pneumatic sensor, and the like. The data interface 926 is connected to an in-vehicle network 941 via, for example, a terminal that is not illustrated to acquire data generated on the vehicle side such as car speed data.

The content player 927 reproduces content stored in a storage medium (e.g., a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad to execute wireless LAN communication. The wireless communication interface 933 can communicate with another apparatus via a wireless LAN access point in the infrastructure mode. In addition, the wireless communication interface 933 can directly communicate with another apparatus in a direct communication mode, such as an ad hoc mode, Wi-Fi Direct, or the like. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation apparatus 920 may include a plurality of antennas, without being limited to the example of FIG. 18. In this case, the antenna switch 934 may be omitted from the configuration of the car navigation apparatus 920.

The battery 938 supplies electric power to each of the blocks of the car navigation apparatus 920 shown in FIG. 18 via power supply lines partially indicated by dashed lines in the drawing. In addition, the battery 938 accumulates electric power supplied from the vehicle.

In the car navigation apparatus 920 shown in FIG. 18, the control unit 280 described with reference to FIG. 2, the control unit 390 described with reference to FIG. 3, and the control unit 440 described with reference to FIG. 4, may be implemented in the wireless communication interface 933. Also, a portion of these functions may be implemented in the processor 921.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a CD (Compact Disc), an MD (MiniDisc), and a DVD (Digital Versatile Disk), a memory card, and a Blu-ray disc (registered trademark) can be used.

In addition, the effects described in the present specification are not limiting but are merely examples, and there may be additional effects.

Additionally, the present technology may also be configured as below.

(1)

An information processing apparatus including:

an acquisition unit configured to acquire information for use in determination for controlling transmission and reception of a stream performed between a plurality of information processing apparatuses in accordance with the Wireless Fidelity (Wi-Fi) CERTIFIED Miracast specification; and a control unit configured to control the transmission and reception on the basis of the acquired information.

(2)

The information processing apparatus according to (1), wherein the acquisition unit acquires, as the information for use in the determination, at least one of one or more items of information about performance of a first information processing apparatus included in the plurality of information processing apparatuses, the one or more items of information including constraint information about constraint conditions for the transmission and reception, information about statuses of the transmission and reception of a stream, and information about a wireless environment in which the transmission and reception of a stream are performed.

(3)

The information processing apparatus according to (1) or (2), wherein the control unit generates control information for controlling the transmission and reception, on the basis of the acquired information, and transmits the generated control information to at least one of the plurality of information processing apparatuses.

(4)

The information processing apparatus according to any of (1) to (3), wherein the control unit generates control information for setting at least one of a frequency band and channel for the stream, a bit rate to be assigned to the stream, an image compression scheme for the stream, and an audio compression scheme for the stream, in the first information processing apparatus included in the plurality of information processing apparatuses, and controls the transmission and reception involved with the first information processing apparatus, on the basis of the generated control information.

(5)

The information processing apparatus according to (3) or (4),
wherein the control unit newly generates the control information, which is triggered by acquisition of the information for use in the determination, and transmits the newly generated control information to at least one of the plurality of information processing apparatuses.

(6)

The information processing apparatus according to any of (3) to (5),
wherein the control unit transmits the control information including time information for specifying time when the first information processing apparatus included in the plurality of information processing apparatuses is to control the transmission and reception, to the first information processing apparatus, and
the first information processing apparatus controls the transmission and reception on the basis of the received control information at the time specified by the time information included in the received control information.

(7)

The information processing apparatus according to any of (3) to (6),
wherein when a channel used for the stream is to be changed, a channel switch request frame and a channel switch response frame specified in the IEEE 802.11z specification are used to exchange information about changing of the channel on the basis of the control information between the plurality of information processing apparatuses.

(8)

The information processing apparatus according to any of (3) to (7),
wherein the acquisition unit receives and acquires the information for use in the determination transmitted from the first information processing apparatus included in the plurality of information processing apparatuses, and
the control unit generates the control information about a second information processing apparatus included in the plurality of information processing apparatuses, on the basis of the information for use in the determination transmitted from the first information processing apparatus, and transmits the generated control information to the second information processing apparatus.

(9)

The information processing apparatus according to any of (1) to (8)
wherein the first information processing apparatus included in the plurality of information processing apparatuses includes
a wireless communication unit configured to transmit constraint information about constraint conditions for the transmission and reception, the constraint information being information about performance of the first information processing apparatus, as the information for use in the determination, to the information processing apparatus, and receives control information for controlling the transmission and reception from the information processing apparatus, and a control unit configured to control the transmission and reception on the basis of the received control information.

(10)

The information processing apparatus according to any of (1) to (9),
wherein the first information processing apparatus included in the plurality of information processing apparatuses includes
a first wireless communication unit configured to operate as a group owner when directly connecting to a second information processing apparatus included in the plurality of information processing apparatuses in one-to-one correspondence using wireless communication, and transmitting and receiving data to and from the second information processing apparatus, and
a second wireless communication unit configured to connect, as a client, to the first wireless communication unit, and connect to the second information processing apparatus and transmit and receive a stream to and from the second information processing apparatus in accordance with the Wi-Fi CERTIFIED Miracast specification.

(11)

The information processing apparatus according to (10),
wherein the first wireless communication unit and the second wireless communication unit exchange information with each other by communication through Wi-Fi Direct connection, or communication compliant with a specification other than IEEE 802.11 and corresponding to the communication through Wi-Fi Direct connection.

(12)

The information processing apparatus according to (10) or (11),
wherein the second wireless communication unit generates a direct link with respect to the second information communication apparatus using a communication scheme specified in the IEEE 802.11z specification, and transmits and receives the stream.

(13)

An information processing apparatus including:
a wireless communication unit configured to transmit, to a control apparatus for controlling transmission and reception of a stream to and from another information processing apparatus in accordance with the Wi-Fi CERTIFIED Miracast specification, constraint information about constraint conditions for the transmission and reception, the constraint information being information about performance of the information processing apparatus, and receive control information for controlling the transmission and reception from the control apparatus; and
a control unit configured to control the transmission and reception on the basis of the received control information.

(14)

An information processing apparatus including:
a first wireless communication unit configured to operate as a group owner when directly connecting to another information processing apparatus in one-to-one correspondence using wireless communication, and transmitting and receiving data to and from the other information processing apparatus, and
a second wireless communication unit configured to connect, as a client, to the first wireless communication unit, and connect to the other information processing apparatus and transmit and receive a stream to and from the other information processing apparatus in accordance with the Wi-Fi CERTIFIED Miracast specification.

(15)

The information processing apparatus according to (14), wherein the first wireless communication unit and the second wireless communication unit exchange information with each other by communication through Wi-Fi Direct connection, or communication compliant with a specification other than IEEE 802.11 and corresponding to the communication through Wi-Fi Direct connection.

(16)

The information processing apparatus according to (14) or (15), wherein the second wireless communication unit generates a direct link with respect to the other information communication apparatus using a communication scheme specified in the IEEE 802.11z specification, and transmits and receives the stream.

(17)

An information processing method including:

an acquisition procedure of acquiring information for use in determination for controlling transmission and reception of a stream performed between a plurality of information processing apparatuses in accordance with the Wi-Fi CERTIFIED Miracast specification; and a control procedure of controlling the transmission and reception on the basis of the acquired information.

REFERENCE SIGNS LIST 100 communication system
101, 102, 200, 300 information processing apparatus
210 image generation unit
220 image encoding unit
230 audio generation unit
240 audio encoding unit
250 stream transmission unit
260 wireless communication unit
261 antenna
270 control signal transmission/reception unit
280 control unit
310 first wireless communication unit
311 antenna
320 second wireless communication unit
321 antenna
330 stream reception unit
340 image decoding unit
350 image output unit
360 audio decoding unit
370 audio output unit
380 control signal transmission/reception unit
390 control unit
400 control apparatus
410 wireless communication unit
411 antenna
420 congestion level determination unit
430 control signal transmission/reception unit
440 control unit
450 storage unit
900 smartphone
901 processor
902 memory
903 storage
904 externally connected interface
906 camera
907 sensor
908 microphone
909 input device
910 display device
911 speaker
913 wireless communication interface
914 antenna switch
915 antenna
917 bus
918 battery
919 auxiliary controller
920 car navigation apparatus
921 processor
922 memory
924 GPS module
925 sensor
926 data interface
927 content player
928 storage medium interface
929 input device
930 display device
931 speaker
933 wireless communication interface
934 antenna switch
935 antenna
938 battery
941 in-vehicle network
942 vehicle module

The invention claimed is:

1. A control apparatus comprising:
a communication interface configured to acquire information from a plurality of information processing apparatuses communicably coupled to the control apparatus, wherein the acquired information is for use in determination for controlling transmission and reception of a stream performed between the plurality of information processing apparatuses, wherein the transmission and reception of the stream is in accordance with the Wireless Fidelity (Wi-Fi) CERTIFIED Miracast specification, wherein the plurality of information processing apparatuses include one or more sink apparatuses and one or more source apparatuses; and
circuitry configured to
control the transmission and reception between each of the plurality of information processing apparatuses on the basis of the acquired information; and
determine if transmission of the Wi-Fi CERTIFIED Miracast stream needs to be changed based on the status of a wireless environment, wherein determining if the transmission of the stream needs to be changed includes
acquiring congestion information for each channel in which a Wi-Fi CERTIFIED Miracast stream is being transmitted,
determining if congestion is present in a channel of interest based on comparing the acquired congestion information with a predetermined threshold,
in response to the acquired congestion information being less than the predetermined threshold, calculating a stream bit rate based on the acquired congestion information of the channel of interest,
in response to the acquired congestion information being greater than the predetermined threshold, determining if congestion has been present in the channel of interest for a predetermined amount of time, in response to the congestion having been present in the channel of interest for at least the predetermined amount of time, selecting another channel with the least congestion, calculating a stream bit rate based on congestion information of the subsequently selected channel and notifying the information processing apparatus of the subsequently selected channel and the stream bit rate of the subsequently selected channel.

2. The control apparatus according to claim 1, wherein the control interface is configured to acquire, as the information for use in the determination, at least one of one or more items of information about performance of a first information processing apparatus included in the plurality of information processing apparatuses, the one or more items of information including constraint information about constraint conditions for the transmission and reception, information about statuses of the transmission and reception of a stream, and information about the wireless environment in which the transmission and reception of a stream are performed.

3. The control apparatus according to claim 2, wherein the circuitry is configured to generate control information for setting at least one of a frequency band and channel for the stream, a bit rate to be assigned to the stream, an image compression scheme for the stream, and an audio compression scheme for the stream, in the first information processing apparatus included in the plurality of information processing apparatuses, and controls the transmission and reception involved with the first information processing apparatus, on the basis of the generated control information.

4. The control apparatus according to claim 2, wherein the first information processing apparatus included in the plurality of information processing apparatuses includes wireless communication circuitry configured to transmit constraint information about constraint conditions for the transmission and reception, the constraint information being information about performance of the first information processing apparatus, as the information for use in the determination, to the information processing apparatus, and receive control information for controlling the transmission and reception from the information processing apparatus, and first information processing apparatus circuitry configured to control the transmission and reception on the basis of the received control information.

5. The control apparatus according to claim 1, wherein the circuitry is configured to generate control information for controlling the transmission and reception, on the basis of the acquired information, and transmit the generated control information to at least one of the plurality of information processing apparatuses.

6. The control apparatus according to claim 5, wherein the circuitry is configured to newly generate the control information, which is triggered by acquisition of the information for use in the determination, and transmits the newly generated control information to at least one of the plurality of information processing apparatuses.

7. The control apparatus according to claim 5, wherein the circuitry is configured to transmit the control information including time information for specifying time when the first information processing apparatus included in the plurality of information processing apparatuses is to control the transmission and reception, to the first information processing apparatus, and the first information processing apparatus controls the transmission and reception on the basis of the received control information at the time specified by the time information included in the received control information.

8. The control apparatus according to claim 5, wherein when a channel used for the stream is to be changed, a channel switch request frame and a channel switch response frame specified in the IEEE 802.11z specification are used to exchange information about changing of the channel on the basis of the control information between the plurality of information processing apparatuses.

9. The control apparatus according to claim 5, wherein the communication interface is configured to receive and acquire the information for use in the determination transmitted from the first information processing apparatus included in the plurality of information processing apparatuses, and the circuitry is configured to generate the control information about a second information processing apparatus included in the plurality of information processing apparatuses, on the basis of the information for use in the determination transmitted from the first information processing apparatus, and transmits the generated control information to the second information processing apparatus.

10. The control apparatus according to claim 1, wherein the first information processing apparatus included in the plurality of information processing apparatuses includes a first wireless communication circuitry configured to operate as a group owner when directly connecting to a second information processing apparatus included in the plurality of information processing apparatuses in one-to-one correspondence using wireless communication, and transmitting and receiving data to and from the second information processing apparatus, and a second wireless communication circuitry configured to connect, as a client, to the first wireless communication circuitry, and connect to the second information processing apparatus and transmit and receive a stream to and from the second information processing apparatus in accordance with the Wi-Fi CERTIFIED Miracast specification.

11. The control apparatus according to claim 10, wherein the first wireless communication circuitry and the second wireless communication circuitry exchange information with each other by communication through Wi-Fi Direct connection.

12. The control apparatus according to claim 10, wherein the second wireless communication circuitry is configured to generate a direct link with respect to the second information processing apparatus using a communication scheme specified in the IEEE 802.11z specification, and transmits and receives the stream.

13. An information processing apparatus comprising:
wireless communication circuitry configured to transmit, to a control apparatus for controlling transmission and reception of a stream to and from another information processing apparatus in accordance with the Wi-Fi CERTIFIED Miracast specification, constraint information about constraint conditions for the transmission and reception, the constraint information being information about performance of the information processing apparatus, and receive control information from the control apparatus for controlling the transmission and reception from the control apparatus; and
circuitry configured to
control the transmission and reception on the basis of the received control information from the control apparatus, and
receive notification from the control apparatus of a newly selected channel and the stream bit rate of the newly selected channel based on determining if transmission of the Wi-Fi CERTIFIED Miracast stream needs to be changed based on the status of a wireless environment, wherein determining if the transmission of the stream needs to changed includes
acquiring congestion information for each channel in which a Wi-Fi CERTIFIED Miracast stream is being transmitted,
determining if congestion is present in a channel of interest based on comparing the acquired congestion information with a predetermined threshold,
in response to the acquired congestion information being less than the predetermined threshold, calculating a stream bit rate based on the acquired congestion information of the channel of interest,
in response to the acquired congestion information being greater than the predetermined threshold, determining if congestion has been present in the channel of interest for a predetermined amount of time,
in response to the congestion having been present in the channel of interest for at least the predetermined amount of time, selecting another channel with the least congestion,
calculating a stream bit rate based on congestion information of the subsequently selected channel, and
notifying the information processing apparatus of the subsequently selected channel and the stream bit rate of the subsequently selected channel.

14. An information processing apparatus comprising:
a first wireless communication circuitry configured to operate as a group owner when directly connecting to another information processing apparatus from a plurality of information processing devices in one-to-one correspondence using wireless communication, and transmitting and receiving data to and from the other information processing apparatus; and
a second wireless communication circuitry configured to connect, as a client, to the first wireless communication circuitry, and connect to the other information processing apparatus and transmit and receive a stream to and from the other information processing apparatus in accordance with the Wi-Fi CERTIFIED Miracast specification,
wherein the information processing apparatus is communicably coupled to a control apparatus, wherein the control apparatus is configured to
control the transmission and reception between the plurality information processing apparatuses on the basis of acquired information from the information processing apparatus and each of the other information processing apparatuses from the plurality of information processing apparatuses; and
determine if transmission of the Wi-Fi CERTIFIED Miracast stream needs to be changed based on the status of a wireless environment, wherein determining if the transmission of the stream needs to changed includes
acquiring congestion information for each channel in which a Wi-Fi CERTIFIED Miracast stream is being transmitted,
determining if congestion is present in a channel of interest based on comparing the acquired congestion information with a predetermined threshold,
in response to the acquired congestion information being less than the predetermined threshold, calculating a stream bit rate based on the acquired congestion information of the channel of interest,
in response to the acquired congestion information being greater than the predetermined threshold, determining if congestion has been present in the channel of interest for a predetermined amount of time,
in response to the congestion having been present in the channel of interest for at least the predetermined amount of time, selecting another channel with the least congestion,
calculating a stream bit rate based on congestion information of the subsequently selected channel, and
notifying the information processing apparatus of the subsequently selected channel and the stream bit rate of the subsequently selected channel.

15. The information processing apparatus according to claim 14,
wherein the first wireless communication circuitry and the second wireless communication circuitry exchange information with each other by communication through Wi-Fi Direct connection.

16. The information processing apparatus according to claim 14,
wherein the second wireless communication circuitry is configured to generate a direct link with respect to the other information communication apparatus using a communication scheme specified in the IEEE 802.11z specification, and transmit and receive the stream.

17. An information processing method comprising:
acquiring, via a communication interface, information from a plurality of information processing apparatuses communicably coupled to the control apparatus, wherein the acquired information is for use in determination for controlling transmission and reception of a stream performed between the plurality of information processing apparatuses in accordance with the Wi-Fi CERTIFIED Miracast specification, wherein the plurality of information processing apparatuses include one or more sink apparatuses and one or more source apparatuses;
controlling, via circuitry, the transmission and reception between each of the plurality of information processing apparatuses on the basis of the acquired information; and
determining if transmission of the Wi-Fi CERTIFIED Miracast stream needs to be changed based on the status of a wireless environment, wherein determining if the transmission of the stream needs to be changed includes acquiring congestion information for each channel in which a Wi-Fi CERTIFIED Miracast stream is being transmitted, determining if congestion is present in a channel of interest based on comparing the acquired congestion information with a predetermined threshold, in response to the acquired congestion information being less than the predetermined threshold, calculating a stream bit rate based on the acquired congestion information of the channel of interest, in response to the acquired congestion information being greater than the predetermined threshold, determining if congestion has been present in the channel of interest for a predetermined amount of time, in response to the congestion having been present in the channel of interest for at least the predetermined amount of time, selecting another channel with the least congestion, calculating a stream bit rate based on congestion information of the subsequently selected channel, and notifying the information processing apparatus of the subsequently selected channel and the stream bit rate of the subsequently selected channel.

* * * * *